US012725004B2

(12) United States Patent
Das et al.

(10) Patent No.: US 12,725,004 B2
(45) Date of Patent: Sep. 1, 2026

(54) NEURAL ARCHITECTURE SEARCH BASED OPTIMIZED DNN MODEL GENERATION FOR EXECUTION OF TASKS IN ELECTRONIC DEVICE

(71) Applicant: Samsung Electronics Co., Ltd., Suwon-si (KR)

(72) Inventors: Mayukh Das, Bengaluru (IN); Venkappa Mala, Bengaluru (IN); Brijraj Singh, Bengaluru (IN); Pradeep Nelahonne Shivamurthappa, Bengaluru (IN); Sharan Kumar Allur, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1032 days.

(21) Appl. No.: 17/211,606

(22) Filed: Mar. 24, 2021

(65) Prior Publication Data

US 2021/0350203 A1 Nov. 11, 2021

(30) Foreign Application Priority Data

May 7, 2020 (IN) ............................ 202041019468
Dec. 15, 2020 (IN) ............................ 202041019468

(51) Int. Cl.
*G06N 3/04* (2023.01)
*G06N 3/08* (2023.01)

(52) U.S. Cl.
CPC ................ *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS 5,787,408 A 7/1998 Deangelis
8,626,698 B1 1/2014 Nikolaev et al.
(Continued)

FOREIGN PATENT DOCUMENTS

CN 110580527 A 12/2019
CN 111159489 A 5/2020
JP 2019-159693 A 9/2019

OTHER PUBLICATIONS

Molina et.al., "Padé Activation Units: End-to-End Learning of Flexible Activation Functions in Deep Networks", Feb. 4, 2020, Published as a conference paper at ICLR 2020 (Year: 2020).*
(Continued)

*Primary Examiner* — Alexey Shmatov
*Assistant Examiner* — Duy T Diep

(57) ABSTRACT

Embodiments herein provide a NAS method of generating an optimized DNN model for executing a task in an electronic device. The method includes identifying the task to be executed in the electronic device. The method includes estimating a performance parameter to be achieved while executing the task. The method includes determining hardware parameters of the electronic device required to execute the task based on the performance parameter and the task, and determining optimal neural blocks from a plurality of neural blocks based on the performance parameter and the hardware parameter of the electronic device. The method includes generating the optimized DNN model for executing the task based on the optimal neural blocks, and executing the task using the optimized DNN model.

19 Claims, 25 Drawing Sheets

(56) References Cited

U.S. PATENT DOCUMENTS

| | | | | |
|---|---|---|---|---|
| 9,177,550 | B2 | 11/2015 | Yu | |
| 10,496,927 | B2 * | 12/2019 | Achin | G06N 20/10 |
| 11,468,275 | B1 * | 10/2022 | Blechschmidt | G06N 20/00 |
| 12,353,971 | B1 * | 7/2025 | Perumalla | G06N 3/048 |
| 2014/0257803 | A1 | 9/2014 | Yu et al. | |
| 2015/0019214 | A1 * | 1/2015 | Wang | G06N 3/02 704/232 |
| 2016/0132787 | A1 * | 5/2016 | Drevo | G06N 20/10 706/12 |
| 2016/0358070 | A1 | 12/2016 | Brothers et al. | |
| 2018/0032867 | A1 * | 2/2018 | Son | G06N 3/04 |
| 2018/0165597 | A1 | 6/2018 | Jordan et al. | |
| 2018/0189638 | A1 | 7/2018 | Nurvitadhi et al. | |
| 2018/0307987 | A1 | 10/2018 | Bleiweiss et al. | |
| 2019/0147337 | A1 * | 5/2019 | Yang | G06N 3/08 706/25 |
| 2019/0188537 | A1 | 6/2019 | Dutta et al. | |
| 2019/0251440 | A1 | 8/2019 | Kasiviswanathan et al. | |
| 2019/0258964 | A1 | 8/2019 | Dube et al. | |
| 2019/0354837 | A1 | 11/2019 | Zhou et al. | |
| 2019/0362222 | A1 | 11/2019 | Chen | |
| 2020/0005135 | A1 | 1/2020 | Che | |
| 2020/0184318 | A1 * | 6/2020 | Minezawa | G06N 20/10 |
| 2021/0089285 | A1 | 3/2021 | Du et al. | |
| 2021/0092035 | A1 * | 3/2021 | Williams | H04L 47/22 |
| 2021/0097383 | A1 * | 4/2021 | Kaur | G06N 3/082 |
| 2021/0109725 | A1 | 4/2021 | Du et al. | |
| 2021/0109726 | A1 | 4/2021 | Du et al. | |
| 2021/0109727 | A1 | 4/2021 | Du et al. | |
| 2021/0109728 | A1 | 4/2021 | Du et al. | |
| 2021/0109729 | A1 | 4/2021 | Du et al. | |
| 2021/0274251 | A1 * | 9/2021 | Wang | H04N 21/440281 |
| 2021/0312276 | A1 * | 10/2021 | Rawat | G06F 18/24143 |
| 2021/0319272 | A1 * | 10/2021 | Gaidon | G06V 10/82 |
| 2022/0347583 | A1 * | 11/2022 | He | G06F 3/04847 |
| 2024/0273336 | A1 * | 8/2024 | Tan | G06N 3/044 |

OTHER PUBLICATIONS

Examination report dated Dec. 20, 2021, in connection with Indian Application No. 202041019468, 8 pages.

Van Stein et al., "Automatic Configuration of Deep Neural Networks with Parallel Global Optimization", Oct. 10, 2018, 8 pages.

Saxena et al., "Convolutional Neural Fabrics", Computer Vision and Pattern Recognition, Jun. 8, 2016, 9 pages.

Molina et al., "Pade Activation Units: End-to-End Learning of Flexible Activation Functions in Deep Networks", Feb. 4, 2020, 17 pages.

Cai et al., "ProxylessNAS: Direct Neural Architecture Search on Target Task and Hardware", Feb. 23, 2019, 13 pages.

International Search Report dated Jun. 17, 2021 in connection with International Patent Application No. PCT/KR2021/002400, 4 pages.

Written Opinion of the International Searching Authority dated Jun. 17, 2021 in connection with International Patent Application No. PCT/KR2021/002400, 4 pages.

Hearing Notice issued Jan. 16, 2025, in connection with Indian Patent Application No. 202041019468, 4 pages.

* cited by examiner

Figure 1B:
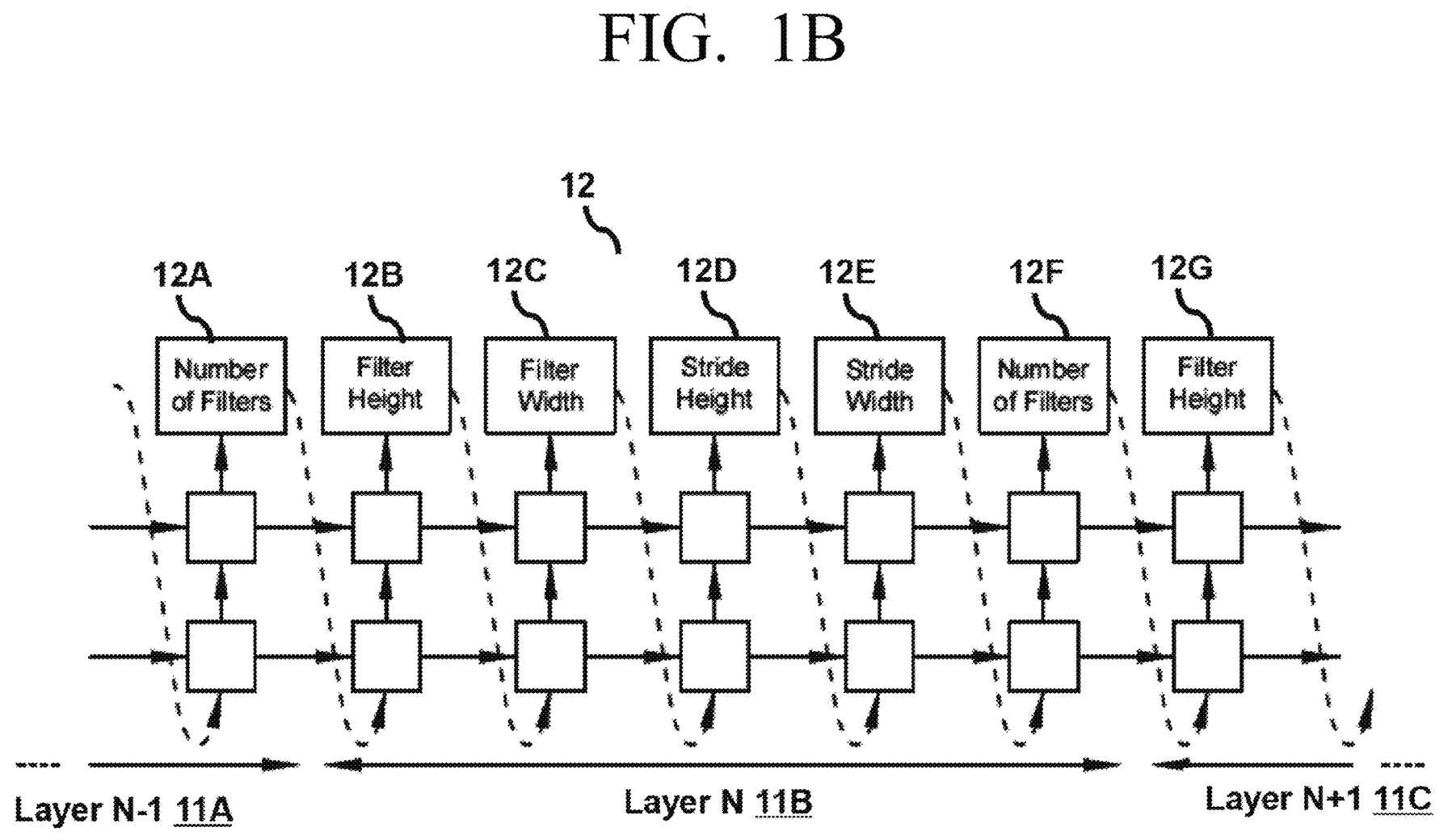

12A Number of Filters

12B Filter Height

12C Filter Width

12D Stride Height

12E Stride Width

12F Number of Filters

12G Filter Height

Layer N-1 11A

Layer N 11B

Layer N+1 11C

FIG. 3B

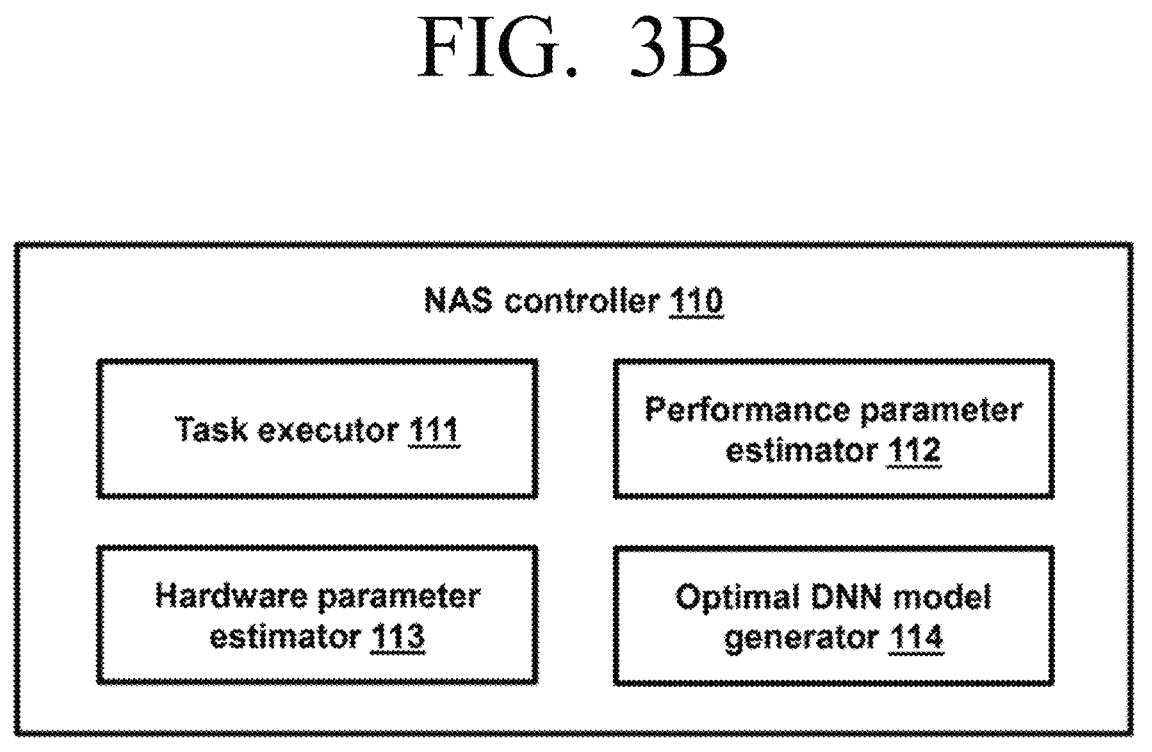

NAS controller 110

Task executor 111

Performance parameter estimator 112

Hardware parameter estimator 113

Optimal DNN model generator 114

504
601
602
603
MB3 5x5 0.22
MB3 5x5 0.24
MB6 5x5 0.62
MB3 3x3 0.21
MB3 5x5 0.22
MB3 5x5 0.25
MB6 7x7 0.86
MB6 7x7 0.66
MB6 7x7 0.85
18B
MB3 5x5 0.30
MB3 5x5 0.42
MB6 3x3 0.71
MB3 3x3 0.31
MB3 3x3 0.39
MB6 5x5 0.74
MB3 3x3 0.43
MB3 3x3 0.83
MB3 3x3 0.47
18C
MB3 5x5 0.40
MB6 7x7 0.48
MB3 7x7 0.26
MB3 3x3 0.23
MB3 7x7 0.29
MB6 5x5 0.44
MB3 5x5 0.42
MB3 5x5 0.30
MB3 5x5 0.40
18D

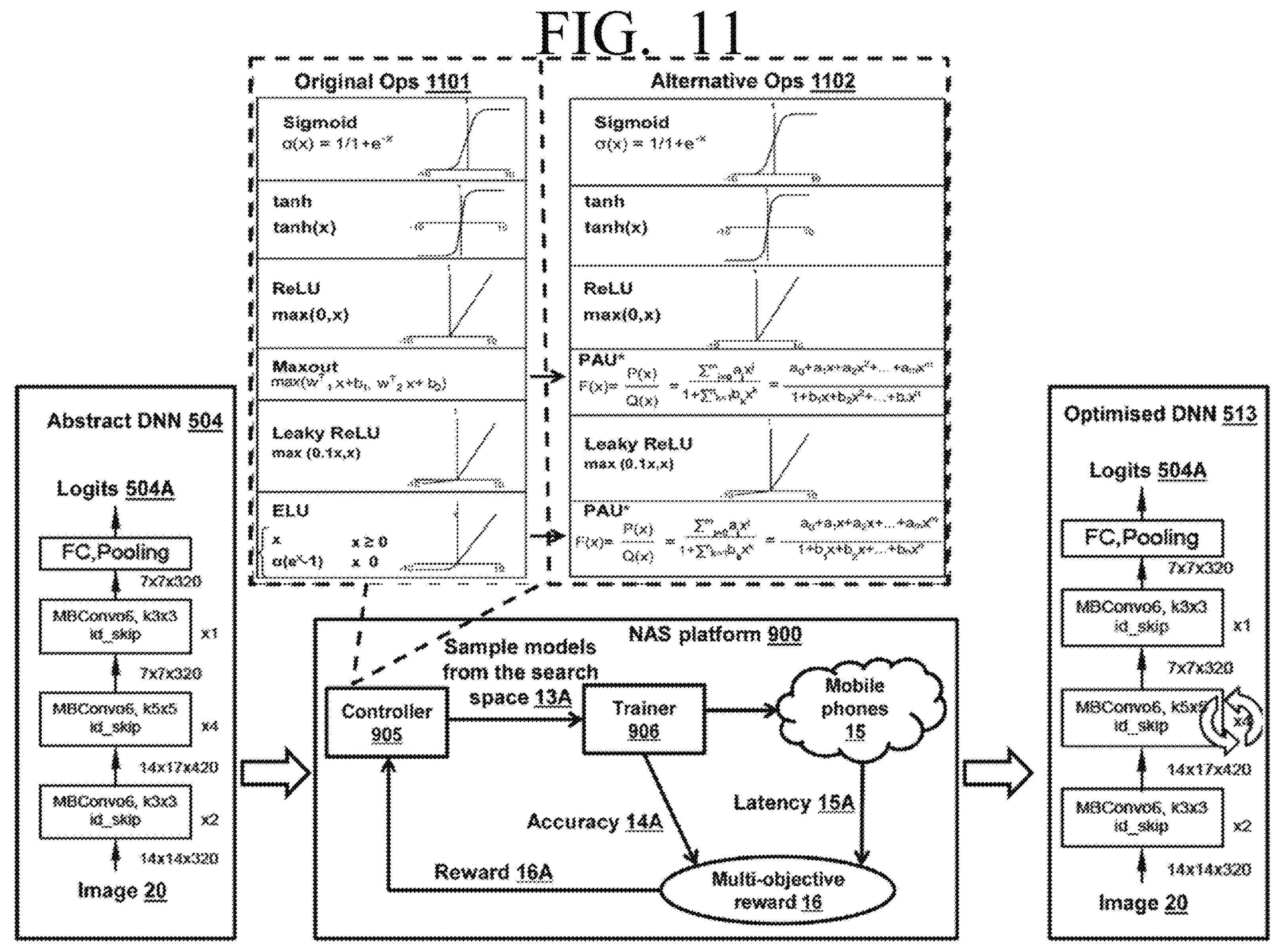
FIG. 11
Original Ops 1101
Sigmoid
σ(x) = 1/1+e^-x
tanh
tanh(x)
ReLU
max(0,x)
Maxout
Leaky ReLU
max (0.1x,x)
ELU
Alternative Ops 1102
Sigmoid
σ(x) = 1/1+e^-x
tanh
tanh(x)
ReLU
max(0,x)
PAU*
Leaky ReLU
max (0.1x,x)
PAU*
Abstract DNN 504
Logits 504A
FC,Pooling
7x7x320
MBConv6, k3x3 id_skip
x1
7x7x320
MBConv6, k5x5 id_skip
x4
14x17x420
MBConv6, k3x3 id_skip
x2
14x14x320
Image 20
NAS platform 900
Sample models from the search space 13A
Controller 905
Trainer 906
Mobile phones 15
Latency 15A
Accuracy 14A
Reward 16A
Multi-objective reward 16
Optimised DNN 513
Logits 504A
FC,Pooling
7x7x320
MBConv6, k3x3 id_skip
x1
7x7x320
MBConv6, k5x5 id_skip
x4
14x17x420
MBConv6, k3x3 id_skip
x2
14x14x320
Image 20

1203
Leaky RelU
1203A
De-Conv
1203B
CNN
BLSTM
US
Unsupported Ops/functions 1203C
GPU 904A
NPU 904B
DSP 904C
Abstract DNN 1201
Deployment 1202

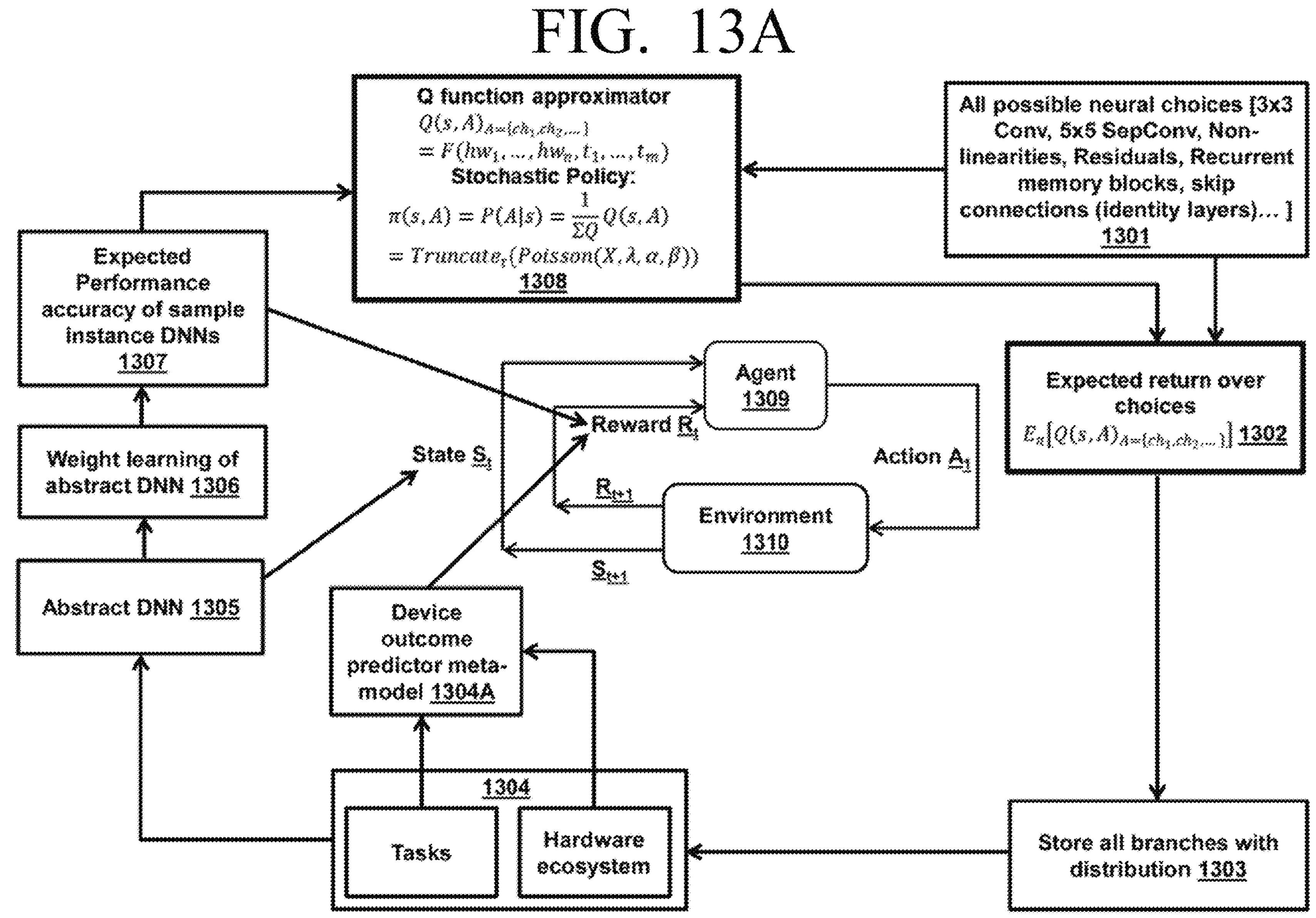

FIG. 13A
Q function approximator
$Q(s,A)_{A=\{ch_1,ch_2,...\}} = F(hw_1,...,hw_n,t_1,...,t_m)$
Stochastic Policy:
$\pi(s,A) = P(A|s) = \frac{1}{\sum Q}Q(s,A) = Truncate_\tau(Poisson(X,\lambda,\alpha,\beta))$
1308
All possible neural choices [3x3 Conv, 5x5 SepConv, Non-linearities, Residuals, Recurrent memory blocks, skip connections (identity layers)… ] 1301
Expected Performance accuracy of sample instance DNNs 1307
Agent 1309
Reward $R_t$
State $S_t$
Action $A_t$
$R_{t+1}$
Environment 1310
$S_{t+1}$
Expected return over choices $E_\pi[Q(s,A)_{A=\{ch_1,ch_2,...\}}]$ 1302
Weight learning of abstract DNN 1306
Abstract DNN 1305
Device outcome predictor meta-model 1304A
1304
Tasks
Hardware ecosystem
Store all branches with distribution 1303 mu=0, sigma=1
truncated to u_min=−1.5, u_max=1.5
0.5
0.4
0.3
0.2
0.1
0.0
−0.1
−3
−2
−1
0
1
2
3
Cropped/truncated regions in an example distribution. i.e. setting the probability of any point beyond the considered regions to zero. 1311

FIG. 16

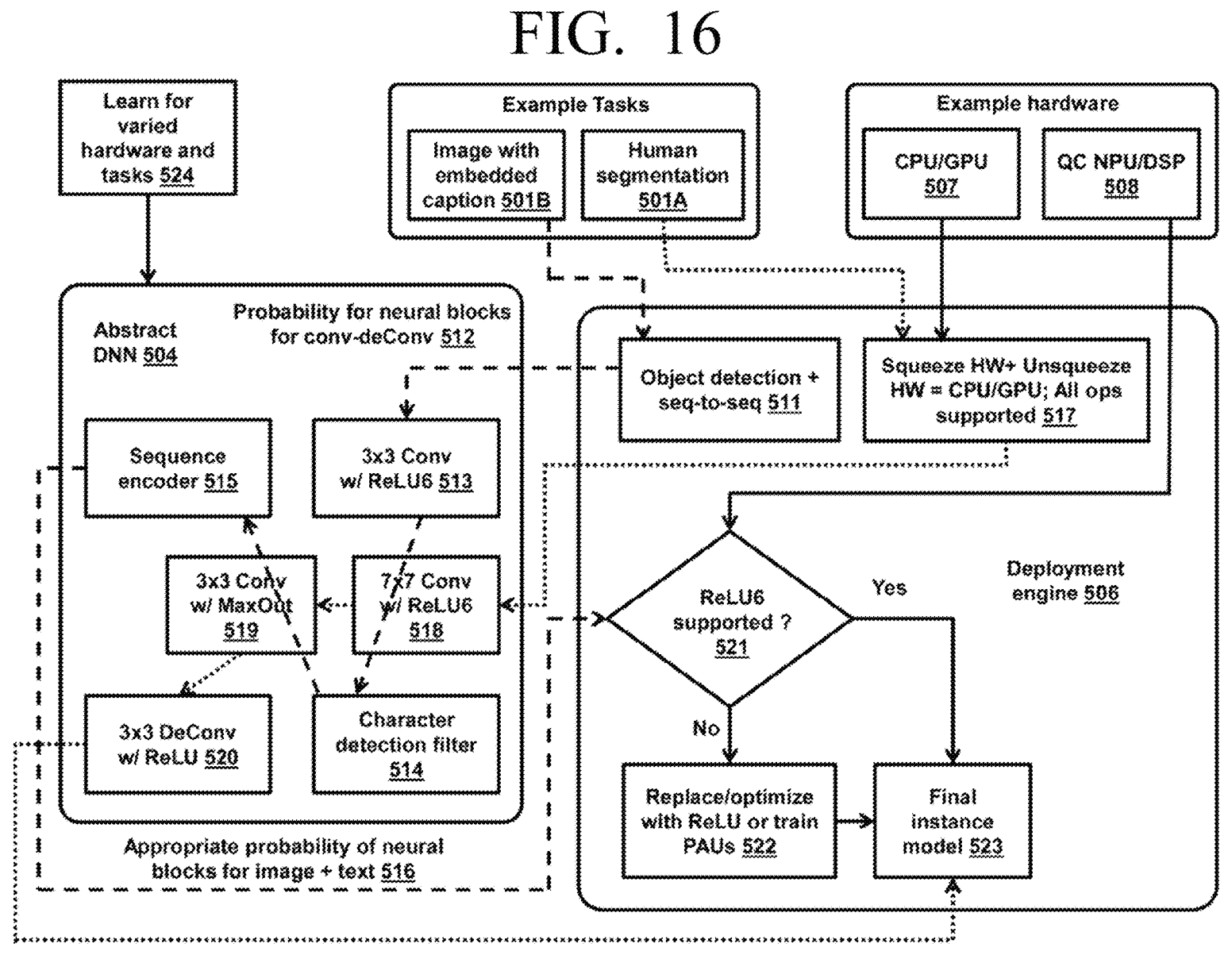

Example hardware

CPU/GPU 507

QC NPU/DSP 508

Example Tasks

Image with embedded caption 501B

Human segmentation 501A

Deployment engine 506

Object detection + seq-to-seq 511

Squeeze HW+ Unsqueeze HW = CPU/GPU; All ops supported 517

ReLU6 supported ? 521

Yes

No

Final instance model 523

Replace/optimize with ReLU or train PAUs 522

Learn for varied hardware and tasks 524

Abstract DNN 504

Probability for neural blocks for conv-deConv 512

3x3 Conv w/ ReLU6 513

7x7 Conv w/ ReLU6 518

Character detection filter 514

Sequence encoder 515

3x3 Conv w/ MaxOut 519

3x3 DeConv w/ ReLU 520

Appropriate probability of neural blocks for image + text 516

NEURAL ARCHITECTURE SEARCH BASED OPTIMIZED DNN MODEL GENERATION FOR EXECUTION OF TASKS IN ELECTRONIC DEVICE

CROSS-REFERENCE TO RELATED APPLICATIONS

This application is based on and claims priority under 35 U.S.C. § 119(a) to India Patent Application No. 202041019468 filed on May 7, 2020 and India Patent Application No. 202041019468 filed on Dec. 15, 2020 in the India Intellectual Property Office, the disclosures of which are herein incorporated by reference in their entirety.

BACKGROUND

1. Field

The present disclosure relates to electronic devices, and more specifically to a Neural Architecture Search (NAS) method and an electronic device for generating a optimized Deep Neural Network (DNN) model to execute a task in the electronic device.

2. Description of Related Art

NAS is a method for learning a structure and an architecture of a DNN model from data. The architecture of the DNN model signifies using various Neural Network (NN) layers, different type of components in the NN layers and interconnections among the NN layers. Numerical weights associated with the different type of components and the interconnections are known as parameters. Traditionally, the architecture of the DNN model is designed manually by a developer/engineer based on a problem requirement and/or a deployment environment and the parameters that are optimized/trained using the data.

Manual steps involved in designing the architecture of the DNN model for different devices includes determining separate architecture learning pipelines for separate tasks and separate devices. In case of designing the architecture of the DNN model for a new device, a latency of the new device needs to be estimated and recorded. Further, the NAS needs to be performed using the estimated latency of the new device or the NAS needs to be performed directly on the new device. The manual steps involved in each separate architecture learning pipeline includes identification and mathematical characterization of hardware configurations, a problem space (i.e. a task or a problem to solve in a use case). Further, the manual steps include identification of a base architecture such that a pruned hypothesis space that can be determined for the NAS to search for the architecture of the DNN model.

Further, the manual steps include learning the architecture for the new device, a weight training and deployment of the architecture of the DNN on the new device. If a failure occurs in the deployment, the developer needs to customize the architecture or reinitiates the learning from a scratch. Hence, an additional engineering effort, a sub-optimal performance, unnecessary architecture learning cycles, redundant deployment cycles etc., are needed for manually designing the architecture of the DNN model for various tasks and various hardware configurations. Due to increasing complexity of problems in Artificial Intelligence (AI), the manual design of the architecture of the DNN model is not a sustainable approach anymore. Moreover, some operations supported by hardware specifications, such as a Neural processing Unit (NPU)/Digital Signal Processor (DSP) of a vendor may be incompatible with hardware specifications providing by other vendor. For example, a Leaky Relu is not supported on NPUs.

SUMMARY

The principal object of the embodiments herein is to provide a NAS method and an electronic device for generating an optimized DNN model to execute a task. The proposed method can be used to optimize a DNN model by changing/approximating unsupported operations in the DNN model with supported operations or universal approximators such that any AI based use cases can work well in the electronic device. Thus, the proposed method reduces a drop ratio occurs due to operation incompatibility issues to a significant amount and engineering effort needed for implementing incompatible operations.

Another object of the embodiments herein is to estimate a performance parameter to be achieved while executing the task.

Another object of the embodiments herein is to determine hardware parameters of the electronic device used to execute the task based on the performance parameter and the task. The electronic device learns a complete abstract parameterized deep network with multiple possible paths and subsequent instantiation at a deployment time based on the hardware parameters. The abstract parameterized deep network is globally applicable and can be used for learning various ecosystem of electronic devices and diverse tasks. Hence, a time/effort/computing resources used for learning separate pipelines can be saved using the proposed method.

Another object of the embodiments herein is to determine optimal neural blocks from a plurality of neural blocks based on the performance parameter and the hardware parameters of the electronic device.

Another object of the embodiments herein is to generate the optimized DNN model for executing the task based on the optimal neural blocks.

Accordingly, the embodiments herein provide a NAS method of generating an optimized DNN model for executing a task in an electronic device. The method includes identifying, by the electronic device, the task to be executed in the electronic device. Further, the method includes estimating, by the electronic device, a performance parameter to be achieved while executing the task. Further, the method includes determining, by the electronic device, hardware parameters of the electronic device used to execute the task based on the performance parameter and the task. Further, the method includes determining, by the electronic device, optimal neural blocks from a plurality of neural blocks based on the performance parameter and the hardware parameters of the electronic device. Further, the method includes generating, by the electronic device, the optimized DNN model for executing the task based on the optimal neural blocks. Further, the method includes executing, by the electronic device, the task using the optimized DNN model.

In an embodiment, where estimating, by the electronic device, the performance parameter to be achieved while executing the task includes obtaining, by the electronic device, execution data for different types of DNN architectural elements from different types of hardware configuration of a plurality of electronic devices, training, by the electronic device, a hybrid ensemble meta-model based on the execution data; and estimating, by the electronic device, the performance parameter to be achieved while executing the task based on the hybrid ensemble meta-model.

In an embodiment, where determining, by the electronic device, the optimal neural blocks from a plurality of neural blocks based on the performance parameter and the hardware parameters of the electronic device includes representing, by the electronic device, an intermediate DNN model using the plurality of neural blocks, providing, by the electronic device, data inputs to the intermediate DNN model, determining, by the electronic device, a quality of each neural block in the plurality of neural blocks based on a probability distribution in executing the task using the data inputs, the performance parameter and the hardware parameters, selecting, by the electronic device, the optimal neural blocks from the plurality of neural blocks based on the quality of each neural block, generating, by the electronic device, a standard DNN model using the optimal neural blocks, and optimizing, by the electronic device, the standard DNN model by modifying unsupported operations used for the execution of the task with supported operations to generate the optimized DNN model.

In an embodiment, where representing, by the electronic device, the intermediate DNN model using the plurality of neural blocks, includes maintaining, by the electronic device, a truncated parameterized distribution is maintained over all the plurality of neural blocks at each layer that manifests a measure of a relative value of every neural block among the plurality of neural blocks subject to the hardware parameters and the task, performing, by the electronic device, a truncation operation to select useful neural elements based on Information Value (IV) and upper and lower confidence bounds for executing the task, and representing, by the electronic device, the intermediate DNN model using the selected useful neural elements.

In an embodiment, determining, by the electronic device, the quality of each neural block in the plurality of neural blocks based on the probability distribution in executing the task using the data inputs, the performance parameter and the hardware parameters, includes encoding, by the electronic device, a layer depth and features of neural blocks, creating, by the electronic device, an action space including a set of neural block choices for every learnable block, performing, by the electronic device, a truncation operation to measure usefulness of the set of neural block choices, adding, by the electronic device, an abstract layer with the truncated choices of the set of neural block choices with the hardware parameters and the task, finding, by the electronic device, an expected latency for the set of neural block choices using a latency predictor metamodel, and finding, by the electronic device, an expected accuracy after adding the set of neural block choices by sampling paths in the abstract layer.

In an embodiment, where selecting, by the electronic device, the optimal neural blocks from the plurality of neural blocks based on the quality of each neural block, includes instantiating, by the electronic device, the intermediate DNN model, extracting, by the electronic device, constant values for the task and the hardware parameters based on the intermediate DNN model, and selecting, by the electronic device, the optimal neural blocks from the plurality of neural blocks based on the quality of each neural block.

In an embodiment, where optimizing, by the electronic device, the standard DNN model by modifying unsupported operations used for the execution of the task with supported operations to generate the optimized DNN model, includes searching, by the electronic device, for standard operations at a knowledgebase to replace the unsupported operations, performing, by the electronic device, one of: replacing the unsupported operations with the standard operations, and retraining the neural block with the standard operations, when the standard operations are available; and optimizing the unsupported operations using universal approximator Pade' Approximation Units (PAUs) for the task execution, when the standard operations are unavailable.

Accordingly, the embodiments herein provide the electronic device for generating the optimized DNN model to execute the task. The electronic device includes a NAS controller, a memory, a processor, where the NAS controller is coupled to the memory and the processor. The NAS controller is configured to identify the task to be executed in the electronic device. The NAS controller is configured to estimate the performance parameter to be achieved while executing the task. The NAS controller is configured to determine the hardware parameters of the electronic device used to execute the task based on the performance parameter and the task. The NAS controller is configured to determine the optimal neural blocks from the plurality of neural blocks based on the performance parameter and the hardware parameters of the electronic device. The NAS controller is configured to generate the optimized DNN model for executing the task based on the optimal neural blocks. The NAS controller is configured to execute the task using the optimized DNN model.

Accordingly, the embodiments of the present disclosure provide an intelligent deployment method for neural networks in a multi-device environment. The method includes identifying, by an electronic device (100), a task needs to be executed in the electronic device (100). The method includes estimating, by the electronic device (100), a performance threshold at the time of execution of the identified task. The method includes identifying, by the electronic device (100), an operation capability of the electronic device (100). The method includes configuring, by the electronic device (100), a pre-trained Artificial Intelligence (AI) model to select one or more neural blocks from a plurality neural blocks to optimize a performance of the task in the electronic device (100).

In an embodiment of the present disclosure, the one or more neural blocks can be selected based on a quality of each neural block.

In an embodiment of the present disclosure, the quality of each neural block can be determined using a probability distribution in the task execution.

In an embodiment of the present disclosure, the performance threshold comprises at least one of an accuracy threshold, a quality threshold of image, a latency threshold, a memory consumption threshold, a power consumption threshold, and a bandwidth threshold.

In an embodiment of the present disclosure, the operation capability of the electronic device (100) includes a memory of the electronic device (100), a screen refresh rate, a sampling rate, a camera resolution, a pixel density of a screen, a frame rate, a screen resolution, single/multiple display, an audio format support, a video format support, and an Application Programming Interface (API) support.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A-1B illustrate a conceptual idea of searching for neural components at every layer of a NN, according to an embodiment as disclosed herein;

FIG. 3B illustrates a block diagram of a NAS controller for executing the task using the optimized DNN model, according to an embodiment as disclosed herein;

FIG. 11 illustrates customization of the abstract DNN model with compatible alternate operations, according to an embodiment as disclosed herein;

FIG. 13A illustrates a flow diagram that includes steps performed by a RL based learning engine, according to an embodiment as disclosed herein;

FIG. 16 illustrates an example scenario of text detection and segmentation over an image using a proposed deployment engine, according to an embodiment as disclosed herein.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Figure 1A:
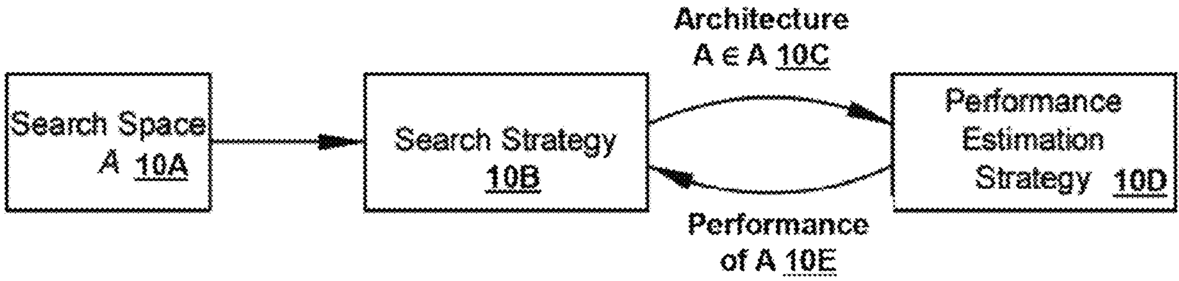

FIGS. 1A-1B illustrate a conceptual idea of searching for neural components at every layer (11A, 111B, 11C) of the DNN model (12). The neural components vary with "hyperparameters", such as a number of filter (12A, 12F), a filter size (12B, 12C, 12G), a stride (12D, 12E), an expansion ratio and so on. Determining a correct balance of the hyperparameters is equal to determining a correct choice of a neural block in any layer (11A, 111B, 11C) of the DNN model (12). Manually determining for a correct choice is not feasible. Hence, the NAS is proposed as a solution for automatically determining the correct choice of neural blocks. The NAS is performed based on a search space 10A, a search strategy 10B and a performance estimation strategy 10D for determining the correct choice. The search space 10A includes of all possible choices of the neural blocks. The search strategy 10B signifies a system or the choice of methods (10C) that can perform a search for the correct choice of the neural blocks repetitively and develop the DNN model (12) in an efficient and effective manner. The performance estimation strategy (10D) assists in the search to estimate a good candidate choice of the neural block, where the performance evaluation strategy (10E) is equivalent to a loss function in traditional machine learning methods.

Figure 1C:
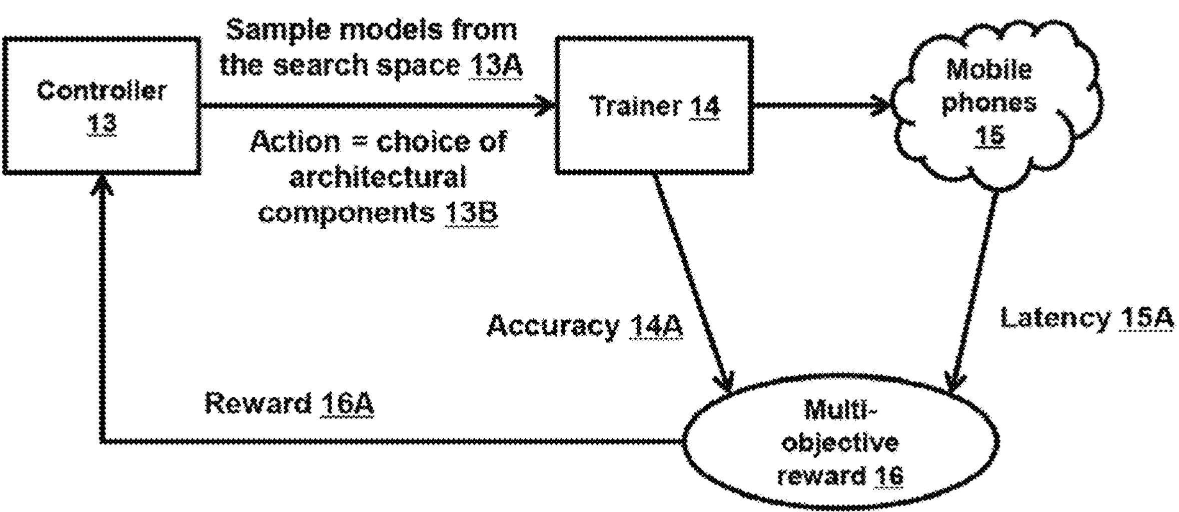
FIG. 1C illustrates a schematic representation of a reinforcement learning based search strategy, according to an embodiment as disclosed herein.

FIG. 1C illustrates a schematic representation of a reinforcement learning based search strategy. Broad categories of the search strategy include a Bayesian optimization, an evolutionary method, a reinforcement learning and so on. The reinforcement learning based search strategy is formulated mathematically as a Markov decision process, which in simple terms includes a state space (13A), an action space (13B), and a reward function (16A). The state space (13A) signifies a current set of candidate neural architectures. The action space (13B) signifies a set of all neural block choices. The reward function (16A) signifies an accuracy/efficiency of the candidate neural architectures. The reinforcement learning learns a policy, where the policy is a model of a probability distribution over an action for a given state, i.e. the reinforcement learning estimates a usefulness or probability of the action in the given state. The reinforcement learning selects the action based on the learned policy, and performs the action on the deployment environment. The deployment environment provides a feedback as a result of the action being performed, where the feedback is known as the reward function (16A). The reward function (16A) is then used to update the policy such that a better action can be taken next time. The estimation of the usefulness or probability of the action continues until reaches a terminal state or a convergence. In simple reinforcement learning, the reward function (16A) is a scalar value. But in case of complex situations, the reward function (16A) is a composition or a vector of multiple-components.

Figure 2A:
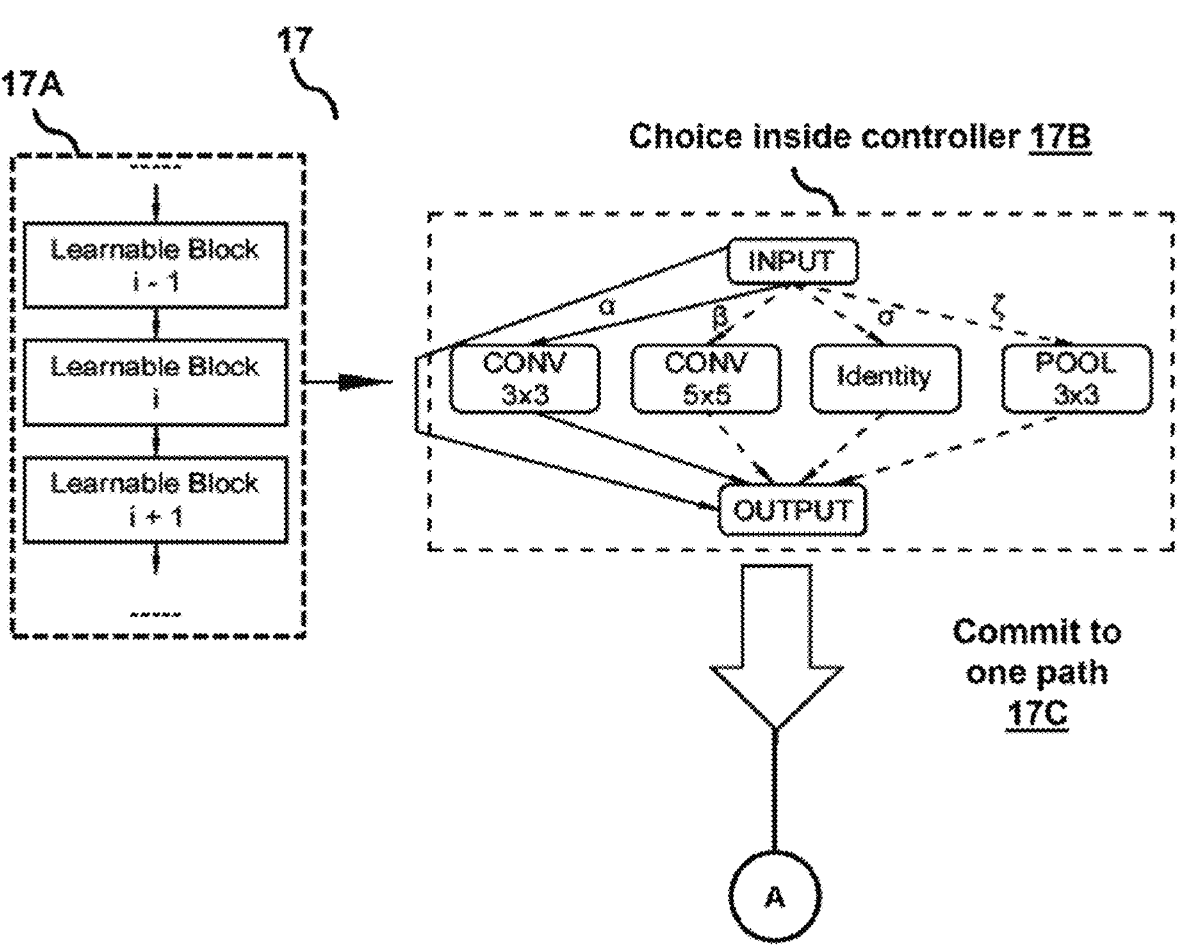
FIGS. 2A-2B illustrate a result of search process on an ecosystem of hardware or tasks, according to an embodiment as disclosed herein.
Figure 2B:
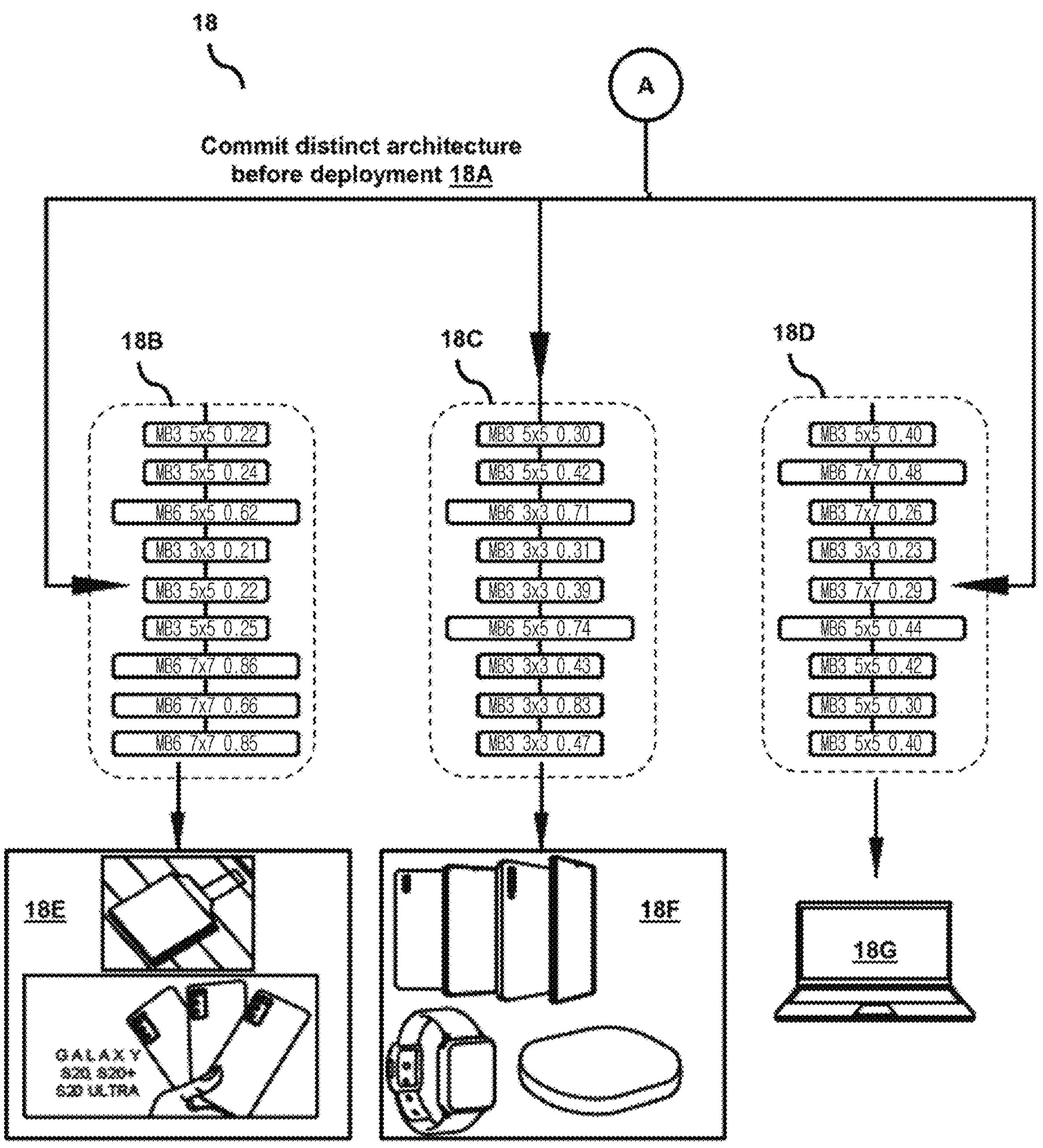

FIGS. 2A-2B illustrate a result of search process on an ecosystem of hardware or tasks to be executed by the hardware. A state of available choices of neutral blocks (17B) during a particular iteration of the search process in the traditional NAS is shown in notation 17, where the particular iteration in the traditional NAS is called here as a learnable block (17A). For instance, a scenario of four different choices (17B) available inside a controller (13), i.e. a 3×3 convolution, a 5×5 convolution, an identity, and a 3×3 pooling. A deterministic choice can be made from the policy before moving to a next learnable block according to a conventional method. In the learnable block (i), for instance the search process makes a choice or "commits" (e.g. 3×3 Cony with weight a) (17C) before searching for a learnable block (i+1). The policy in turn is learned using the feedback/reward is subject to a given hardware/task. Thus, any change in the given hardware, the search process needs to be done again from the scratch.

The effect of the search process on the ecosystem of the hardware or tasks is shown in the environment 18 of FIG. 2B. At 18A, since all commitment is done during the search process and before DNN model (12) is actually deployed on a target device in a given ecosystem of device hardware (18E, 18F, 18G) with same task is addressed, or a different hardware with slightly varying tasks, the search process creates distinct architecture learning/search pipelines (18B, 18C, 18D). Hence, for every target hardware, the search process has to perform from the scratch and learn a one-off model architecture for a given device hardware, which does not scale to the ecosystem of device hardware (18E, 18F, 18G). Extra manual effort is required for designing the distinct architecture search pipelines.

Accordingly, the embodiments herein provide a Neural Architecture Search (NAS) method of generating an optimized Deep Neural Network (DNN) model for executing task in an electronic device. The method includes identifying, by the electronic device, the task to be executed in the electronic device. Further, the method includes estimating, by the electronic device, performance parameter to be achieved while executing the task. Further, the method includes determining, by the electronic device, hardware parameters of the electronic device used to execute the task based on the performance parameter and the task. Further, the method includes determining, by the electronic device, optimal neural blocks from a plurality of neural blocks based on the performance parameter and the hardware parameters of the electronic device. Further, the method includes generating, by the electronic device, the optimized DNN model for executing the task based on the optimal neural blocks. Further, the method includes executing, by the electronic device, the task using the optimized DNN model.

Accordingly, the embodiments herein provide the electronic device for generating the optimized DNN model to execute the task. The electronic device includes a NAS controller, a memory, a processor, where the NAS controller is coupled to the memory and the processor. The NAS controller is configured to identify the task to be executed in the electronic device. The NAS controller is configured to estimate the performance parameter to be achieved while executing the task. The NAS controller is configured to determine the hardware parameters of the electronic device that are used to execute the task based on the performance parameter and the task. The NAS controller is configured to determine the optimal neural blocks from the plurality of neural blocks based on the performance parameter and the hardware parameters of the electronic device. The NAS controller is configured to generate the optimized DNN model for executing the task based on the optimal neural blocks. The NAS controller is configured to execute the task using the optimized DNN model.

Accordingly, the embodiments herein provide an intelligent deployment method for neural networks in a multi-device environment. The method includes identifying, by an electronic device (100), a task to be executed in the electronic device. The method includes estimating, by the electronic device, a performance threshold at the time of execution of the identified task. The method includes identifying, by the electronic device, an operation capability of the electronic device. The method includes configuring, by the electronic device (100), a pre-trained AI model to select one or more neural blocks from a plurality neural blocks to optimize a performance of the task in the electronic device. A network representation and a LazyNAS method is proposed in this disclosure, where the proposed method allow the electronic device to bypass distinct learning pipelines for different devices and create a globally relevant abstract DNN model that can be instantiated with a suitable architecture at a deployment time. The proposed method allows the electronic device to learn a complete abstract parameterized deep network with multiple possible paths and subsequent instantiation at deployment time based on the hardware parameters. The abstract DNN model is globally applicable and the abstract DNN model can be used for learning various ecosystem of the electronic devices and diverse tasks. Hence, a time/effort/computing resources used for learning separate pipelines can be saved using the proposed method. The LazyNAS method exploits commonalities across different architectures meant for different tasks.

The proposed method seamlessly alleviates all limitations described in conventional methods. The proposed method allows the electronic device to learn the abstract DNN model that preserves the plurality of neural blocks at each stage in multiple branches of NNs. Further, proposed method performs a final selection of appropriate branches based on the hardware parameters of the electronic device on which the abstract DNN model is used to create the final appropriate AI model for a real use case. Branches in the abstract DNN model will be limited because DNN models for different hardware may differ in limited number of layers in the DNN models. So, clubbing similar features together into the abstract DNN model is significantly more advantageous than learning the separate pipelines.

Multi-modal tasks are tasks contain multiple modes. For example, a video frame completion/prediction using other supporting data such as an audio and a text. In such cases deep models used in the video. For example, the deep models for the video frame completion and the audio frame prediction uses deconvolutions steps. So, clubbing similar features together into the abstract DNN model is significantly more advantageous than learning the separate pipelines.

Operations inside the DNN models are depended on hardware components that are suitable for the execution. Some operations in the DNN models may not be supported by other computing units due to not having enough memory bandwidth at the electronic device or a number precision to perform a complex tensor operation. This will cause significant commercial loss due to lower performance in use cases for certain electronic devices or may cause up to 30% of model drop ratio. The proposed method can be used to optimize the DNN model by changing/approximating unsupported operations with supported operations or universal approximators such that all AI based use cases can work well in all electronic devices.

Referring now to the drawings, and more particularly to FIGS. 3A through 16, illustrate various embodiments of the present disclosure.

Figure 3A:
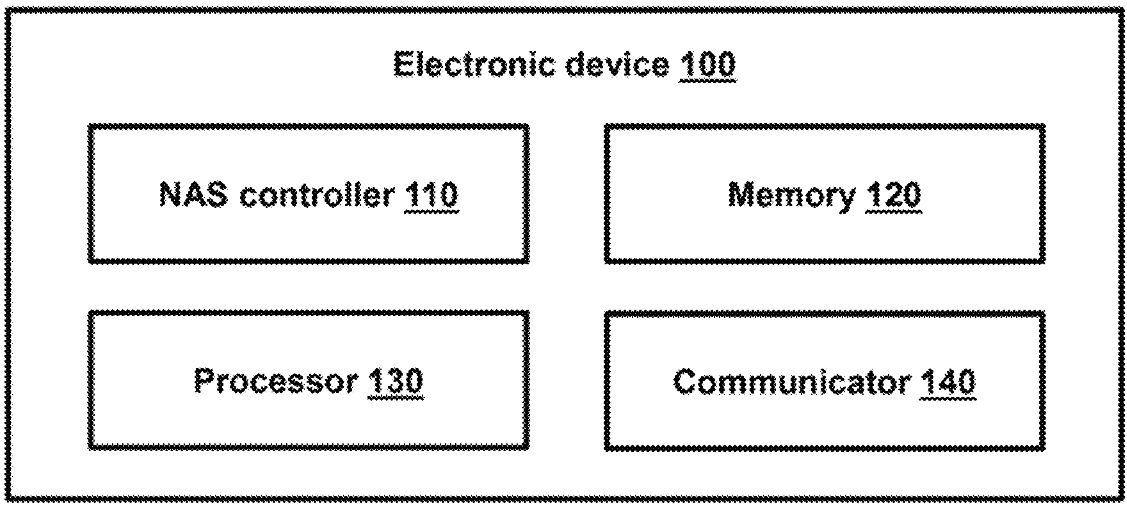
FIG. 3A illustrates a block diagram of an electronic device for generating an optimized DNN model to execute a task, according to an embodiment as disclosed herein.

FIG. 3A illustrates a block diagram of an electronic device (100) for generating the optimized DNN model to execute a task, according to an embodiment as disclosed herein. Examples for the electronic device (100) are, but not limited to a smart phone, a tablet computer, a personal digital assistance (PDA), an Internet of Things (IoT), and the like. In an embodiment, the electronic device (100) includes a NAS controller (110), a memory (120), a processor (130), and a communicator (140).

The NAS controller (110) is configured to identify the task to be executed in the electronic device (100). Playing a video is an example for the task. Converting a file from one format to another format is another example for the task. Downloading a file from a cloud server is another example for the task. The NAS controller (110) is configured to estimate a performance parameter to be achieved while executing the task. Examples for the performance parameter are, but not limited to a latency, a frame rate, a resolution, a bit rate, and the like. In an embodiment, the NAS controller (110) is configured to obtain execution data for different types of DNN architectural elements from different types of hardware configuration of a plurality of electronic devices. Further, the NAS controller (110) is configured to train a hybrid ensemble meta-model based on the execution data. Further, the NAS controller (110) is configured to estimate the performance parameter to be achieved while executing the task based on the hybrid ensemble meta-model.

The NAS controller (110) is configured to determine hardware parameters (also called as hardware configuration) of the electronic device (100) for executing the task based on the performance parameter and the task. Examples for the hardware parameters are, but not limited to a processor speed, number of cores in the processor (130), a data transmission speed wireless modules, a storage capacity of the memory (120), a write/read speed at the memory (120), and the like. The NAS controller (110) is configured to determine optimal neural blocks from a plurality of neural blocks based on the performance parameter and the hardware parameters of the electronic device (100).

In an embodiment, the NAS controller (110) is configured to represent an intermediate DNN model (also called as an intermediate DNN, an abstract DNN or an abstract DNN model or an abstract network) using the plurality of neural blocks. Further, the NAS controller (110) is configured to provide data inputs to the intermediate DNN model. Further, the NAS controller (110) is configured to determine a quality of each neural block in the plurality of neural blocks based on a probability distribution in executing the task using the data inputs, the performance parameter and the hardware parameters. Further, the NAS controller (110) is configured to select the optimal neural blocks from the plurality of neural blocks based on the quality of each neural block. Further, the NAS controller (110) is configured to generate a standard DNN model using the optimal neural blocks. Further, the NAS controller (110) is configured to optimize the standard DNN model by modifying unsupported operations used for the execution of the task with supported operations to generate the optimized DNN model.

The NAS controller (110) is configured to generate the optimized DNN model for executing the at least task based on the optimal neural blocks. The NAS controller (110) is configured to execute the task using the optimized DNN model.

In an embodiment, the NAS controller (110) is configured to maintain a truncated parameterized distribution is maintained over all the plurality of neural blocks at each layer that manifests a measure of a relative value of every neural block among the plurality of neural blocks subject to the hardware parameters and the task. Further, the NAS controller (110) is configured to perform a truncation operation to select useful neural elements based on Information Value (IV) and upper and lower confidence bounds for executing the task. Further, the NAS controller (110) is configured to represent the intermediate DNN model using the selected useful neural elements In an embodiment, the NAS controller (110) is configured to encode a layer depth and features of neural blocks. Further, the NAS controller (110) is configured to create an action space includes a set of neural block choices for every learnable block. Further, the NAS controller (110) is configured to perform a truncation operation to measure usefulness of the set of neural block choices. Further, the NAS controller (110) is configured to add an abstract layer with the truncated choices of the set of neural block choices with the hardware parameters and the task. Further, the NAS controller (110) is configured to find an expected latency for the set of neural block choices using a latency predictor metamodel. Further, the NAS controller (110) is configured to find an expected accuracy after adding the set of neural block choices by sampling paths in the abstract layer for determining the quality of each neural block in the plurality of neural blocks.

In an embodiment, the NAS controller (110) is configured to instantiate the intermediate DNN. Further, the NAS controller (110) is configured to extract constant values for the task and the hardware parameters based on the intermediate DNN. Further, the NAS controller (110) is configured to select the optimal neural blocks from the plurality of neural blocks based on the quality of each neural block.

In an embodiment, the NAS controller (110) is configured to search for standard operations at a knowledgebase to replace the unsupported operations. Further, the NAS controller (110) is configured to replace the unsupported operations with the standard operations, and retraining the neural block with the standard operations, when the standard operations are available. The NAS controller (110) is configured to optimize the unsupported operations using universal approximator Pade' Approximation Units (PAUs) for the task execution, when the standard operations are unavailable.

In an embodiment, the estimating the performance parameter involves building the predictor metamodel for device hardware parameters. The predictor metamodel is a trainable regression function. An input of the predictor metamodel is a vector consisting of hardware parameters such a compute-units, memory size, bus-frequency and architecture parameters such as filter size, convolution type, etc. An output of the predictor metamodel is the estimated latency of a neural block with given architectural parameters and on given hardware configuration. An optimal metamodel is a key factor in the effectiveness of the proposed method. The underlying distribution, given the nature of the feature space (hybrid), will not be a convex hull.

Thus, the ensemble regression models are chosen as the predictor metamodel. Since, the latency is a non-convex piecewise function, an ensemble model can faithfully model different sections of the distribution via multiple weak models. More specifically, a bag-of-boosted regression trees model in which the outer bag is a Random Regression Forest and each inner weak regression model is built via TreeBoost (tree variant of XGBoost). The feature space for the predictor metamodel is vector, $$X = \langle x_A^1, \ldots, x_A^m, x_T^1, \ldots, x_T^n, x_H^1, \ldots, x_H^k \rangle,$$

where, $$x_A^i$$

signifies architectural parameters of a DNN, $$x_T^j$$

signify task parameters and $$x_H^k$$

signify the hardware parameters (compute units, memory capacity etc.). The following steps are involved in metamodel training.

Step 1: Data collection: Execution data is collected for different types of DNN architectural elements and on different types of hardware configuration in the form tuples $\langle X, Y \rangle$ where $$X = \langle x_A^1, \ldots, x_A^m, x_T^1, \ldots, x_T^n, x_H^1, \ldots, x_H^k \rangle,$$

and Y=Latency, MemoryLoad, PowerUse etc.

Step 2: Metamodel learning and tuning: Train hybrid ensemble meta-model M(X)=Y and tune via n-fold cross validation and save optimal model object M*.

Step 3: Integrate with NAS controller: Create callable API for M*, such that it can be accessed from NAS controller (110).

In an embodiment, the intermediate or abstract DNN model contains >1 neural block at each layer, where a truncated parameterized distribution is maintained over all the neural blocks at each layer that manifests a measure of the relative value of every neural block among the plurality of neural blocks subject to hardware and task parameters. The abstract model is actually an encapsulation of numerous possible DNN models represented jointly using higher order representation language such as relational NNs and Neural Logic Machines. Additionally, at every abstract layer there are more than one choices of neural blocks. Consider that the library of all possible Neural block choices is of size n: $\{ch_1, \ldots, ch_n\}$. Now at any layer, a distribution over neural choices of the form, $P(ch_j|X)_{ch_j \in \{ch_1, \ldots, ch_n\}}$ is maintained, where X is the set of features parametrizing the hardware configuration and task properties. It is clear that if n is large, the probability distribution at each layer becomes prohibitively large. So, a 2 step truncation operation is performing by the NAS controller (110) to determine the quality of the neural blocks or choose the most useful neural elements at least abstract layer. The truncation has 2 steps as explained below:

Step 1 (truncation based on information value): An input is neural choices ( ), a past history of usage of neural choices (#times choice_x was used [rec_x], #times choice_x gave good accuracy [pos_x]).

For every choice $\text{Choice}_i$ Get #times $$\text{used} = rec_j^i$$

and #times Accuracy above chosen threshold τ with $$\text{Choice}_i = pos_j^i;\ \forall\ j \in \text{Bins}$$

Information Value for $\text{Choice}_i$, $$(IV^{(i)}) = \sum_{j=1}^{k}\left(\left(\%\ pos_j^i - \%\ rec_j^i\right) \times \ln\left(\frac{\%\ pos_j^i}{\%\ rec_j^i}\right)\right)$$

where k is the number of bins of the domain of a variable in question. For instance, for the neural choice such as DepthwiseConv the domain is the filter size, which may vary between 1 to ∞. (for brevity lets consider 1 to 10). Now there could be 3 bins 1-3, 4-6, 7-10 so k=3. So, for bin 1, $$pos_1^x = \#\ 1\times 1 \text{ or } 2\times 2 \text{ or } 3\times 3$$

filters have been used and gave high Acc. And $$rec_1^x = \#\ 1\times 1 \text{ or } 2\times 2 \text{ or } 3\times 3$$

filters have been used as whole.

Repeat 1) to 3) for #n times

Choose $A=\{x|IV^{(x)} \text{ in top } k\}$

Step 2 (truncation based on confidence bounds): An input is neural choices ($\{Ch_1, \ldots, Ch_n\}$) and the policy distribution over Neural Choices $P(a|X)$; $a \in \{Ch_1, \ldots, Ch_n\}$.

Find lower and upper confidence bounds for $P(a|X)=\mu_{min}$ & $\mu_{max}$ based on confidence level $\delta \geq 95\%$ For finding truncation points based on $\mu_{min}$ & $\mu_{max} \rightarrow \chi_{min}$ & $\chi_{max}$ Choose $B=\{x|\chi_{min} \leq P(x|s) \leq \chi_{max},\ x \in \{Ch_1, \ldots, Ch_n\}\}$ 4) The final truncated choices: $N=A \cap B$ In an embodiment, the representation of intermediate/abstract DN as outlined earlier will happen via some higher order language. For example, consider the following steps:

$p_1$: Filter(layer #,size #): –ComputeUnit(#layer, Hw), Cores(Hw, k), TaskPrec(#layer, p)

$p_2$: DepthConv(#layer): –MemBw(#layer, Hw,>Bw), Cores(Hw, k)

where the steps include clauses that indicate a set of allowed neural elements in that layer.

For example, the choice of whether to include depthwise convolution block is dependent on the body of the 2nd clause which says that it depends on the memory bandwidth and the number of cores. $p_1$ & $p_2$ are probability values assigned to clauses. As is clear these are First Order Logic Horn Clauses and can encapsulate a set of Neural Blocks together. Instantiating each fluent with a particular value is called instantiation. Instantiating all the clauses together will give the actual set of Neural choices in particular layer. Since, the probabilities are with respect to the clauses they are known as parameterized distributions, i.e. the final value of the distribution over neural choices in that layer now depends on the values to the logical variables in the fluents/predicates. For example, $P(ch_x|X)=p_1$ if the memory bandwidth not greater than a value Bw and $P(ch_x|X)=p_1 \times p_2$ otherwise.

In an embodiment, the distribution over the neural block choices is estimated from the policy distribution that is learned through the proposed RL engine. The RL engine checks for a State (i.e. a Current abstract model encoding (layer depth and features of neural blocks), an action space (i.e. a set of neural block choices for every learnable block. Further, the RL engine chooses the action space with neural block choices for layer i→Information Value (IV) to measure usefulness of neural block choices (truncation). The steps are described as follows:

Step 1:

$$IV(choice_x) = \sum_{i=1}^{n}\left(\left(\%\ pos_i - \%\ rec_i\right) \times \left(\%\ \frac{pos_i}{\%\ rec_i}\right)\right) \Rightarrow \text{Set of choices } A.$$

Step 2: Set of choices B←{x: LowerConfidenceBound ≤π(x|s)≤UpperConfidenceBound}.

Step 3: Final truncated choices: $N=A \cap B$

Step 4: Add the abstract layer i with Truncated Choices set N . . . with its parameterized probability distribution $\pi_i(N)=F(X, \lambda, \alpha, \beta)$ where the parameter X is the feature set describing the hardware/task.

Step 5: Find expected latency for the choice set using the latency predictor metamodel 'M' $E_{\pi_i(N)}$ [M(N)]

Step 6: Weight Update of Abstract Candidate Network D (described in next page)

Step 7: Find expected accuracy after adding Neural choice set N by sampling paths in the abstract model $$\sum_{j=1}^{i}\prod_{j}\pi_j \times Acc(\text{layer } 1 \ldots j)$$

Step 8: Update Q function MLP F(θ): $\theta^{t+1}=\theta^t+\eta\nabla_F$, Where $\nabla_F$ is the gradient of the function approximator model.

Step 9: Update policy, where optimal policy is given by $$\pi_i^* = \text{softmax}_{a\in N}(Q_i^*(s, a) + \in_t \Phi_t(s, a)),$$

Where $\Phi_t$ is the shaping function. The shaping function is expressed as:

$$\Phi_{t+1}(s, a) = \Phi_t(s, a) + \beta\delta_t^\Phi \text{ and } \delta^\Phi = R^\Phi(s, a) + \gamma\Phi(s', a') - \Phi(s, a), \text{ where}$$

$$\epsilon_t = \begin{cases} \epsilon_{t-1} \times e^\Delta, & \epsilon > \text{threshold} \\ 0, & \text{otherwise} \end{cases}$$

$$\Delta = Accuracy_t - Accuracy_{t-1}$$

The shaping function encodes the latency and device hardware related metrics, For example: $R^\Phi$=Latency. Hence the distribution over the Neural choices is same as the optimal policy distribution. $P(ch_x|X)=\pi^*$ Architecture learning platform is a Reinforcement Learning driven controller and has partly been adapted from with major changes in the reward vector and policy optimization. Unlike ProxylessNAS, which bypasses proxy such as FLOPS by direct optimization on the given hardware and specific task, a MetaNAS uses predicted latency score from the Metamodel as it is in a feature space that includes task parameters as well making it general and optimal simultaneously. Also, a policy-gradient based RL update is used where the expected reward of a parameterized policy is maximized, $\text{argmax}_\theta(J(\theta)=E[r(\tau_{\pi\{0\}})])$, where $\pi(\theta)$ is the parameterized policy and $\tau_{\pi 9\theta)}$ is the trajectory and r is its reward. Clearly, the reward is a multi-criteria reward vector, $r=\langle \text{Acc}, y_F\rangle$, $y_F$ is piecewise. Thus, the gradient update for the parameterized policy $\theta_{t+1}=\theta_t+\eta\nabla J(\theta_t)$ is now difficult to compute. Hence, a piecewise gradient $$\nabla_i^j + \nabla_j^k + \dots$$

is used for the parameter updates. The RL problem is formulated with the Markov Decision Process definition of the environment which is a tuple: [S, A, R, γ, T] where S is the state space A is the action space, R is the reward function, T=P(s'|s, a) is the transition probability function (s'∈S is the next state, s∈S is current state and a∈A is the action that caused the change of state) and finally γ is the discount factor. If a discounted MDP with $0<\gamma<1$ is used, then the objective becomes $$J(\theta)=E[\gamma^{|\tau|}r(\tau_{\pi(\theta)})]$$

where |τ| is the size of the trajectory. Also, here, the state space is a factored state space described by similar feature space for the predictor metamodel, which is a vector, $$X = \langle x_A^1, \dots, x_A^m, x_T^1, \dots, x_T^n, x_H^1, \dots, x_H^k\rangle,$$

where, $$x_A^i$$

signifies architectural parameters of the candidate abstract DNN w.r.t all the neural blocks that has been added so far, $$x_T^j$$

signify task parameters, and $$x_H^k$$

signify the hardware parameters (i.e. compute units, memory capacity etc.). The action space is all possible Neural Block choices available, $A\subseteq\{Ch_1, \dots, Ch_N\}$. T=P(s'|s, a) is estimated statistically via exploration. The reward function has been defined as R=Accuracy of candidate DNN and $R^\Phi$=Latency.

The quality of the neural blocks among the plurality of neural blocks is subject to the learned policy distribution. The learned policy is parameterized policy. $\pi(\theta)=F(X, \lambda, \alpha, \beta)$, where α& β are distributional shape parameters. In case of Poisson.

$$X = \langle x_A^1, \dots, x_A^m, x_T^1, \dots, x_T^n, x_H^1, \dots, x_H^k\rangle,$$

are the parameters that will be used to instantiate the abstract DNN model. For a given task and hardware, the electronic device (100) extracts constant values for $$x_T^1, \dots, x_T^n = C_T^1, \dots, C_T^n \text{ and } x_H^1, \dots, x_H^k = C_H^1, \dots, C_H^k,$$

For example: Sequential=No, or NPU=Yes. For architectural variables at the time of deployment, they are instantiated with a range instead of exact values. For example: Layer2FilterSize=[2,5]. This is based on truncated neural choices N. Thus, as the time of deployment for any layer i, the instantiated distribution $\pi_i=P(ch|X=x, \lambda, \alpha,\beta)$: $ch\in N_i\cdot\pi_i=P(ch|X=x, \lambda, \alpha,\beta)$ is the measure of quality based on which neural blocks will be selected for each layer at deployment. In an example, the reward is a collection of different things such as accuracy of a current candidate neural blocks, a device latency, floating point operations per second (FLOPS), a memory consumption, a power consumption and so on.

The memory (120) may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM). In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than the memory (120) respectively. In certain examples, a non-transitory storage medium may store data that can, over time, change (e.g., in Random Access Memory (RAM) or cache).

The processor (130) is configured to execute instructions stored in the memory (120). The communicator (140) is configured to communicate internally between hardware components in the electronic device (100). Further, the communicator (140) is configured to facilitate the communication between the electronic device (100) and other devices (e.g. server, etc.)

Although the FIG. 3A shows the hardware components of the electronic device (100) but it is to be understood that other embodiments are not limited thereon. In other embodiments, the electronic device (100) may include less or more number of components. Further, the labels or names of the components are used for illustrative purposes and do not limit the scope of this disclosure. One or more components can be combined together to perform same or substantially similar function for generating the optimized DNN model to execute the task.

FIG. 3B illustrates a block diagram of the NAS controller (110) for executing the task using the optimized DNN model, according to an embodiment as disclosed herein. In an embodiment, the NAS controller (110) includes a task executor (111), a performance parameter estimator (112), a hardware parameters estimator (113), and an optimal DNN model generator (114).

The task executor (111) identifies the task to be executed in the electronic device (100). The performance parameter estimator (112) estimates the performance parameter to be achieved while executing the task. In an embodiment, the performance parameter estimator (112) obtains the execution data for different types of DNN architectural elements from different types of hardware configuration of a plurality of electronic devices. Further, the performance parameter estimator (112) trains the hybrid ensemble meta-model based on the execution data. Further, the performance parameter estimator (112) estimates the performance parameter to be achieved while executing the task based on the hybrid ensemble meta-model.

The hardware parameters estimator (113) determines the hardware parameters of the electronic device (100) used to execute the task based on the performance parameter and the task. The optimal DNN model generator (114) determines the optimal neural blocks from the plurality of neural blocks based on the performance parameter and the hardware parameters of the electronic device (100).

In an embodiment, the optimal DNN model generator (114) represents the intermediate DNN model using the plurality of neural blocks. Further, the optimal DNN model generator (114) provides the data inputs to the intermediate DNN model. Further, the optimal DNN model generator (114) determines the quality of each neural block in the plurality of neural blocks based on the probability distribution in executing the task using the data inputs, the performance parameter and the hardware parameters. Further, the optimal DNN model generator (114) selects the optimal neural blocks from the plurality of neural blocks based on the quality of each neural block. Further, the optimal DNN model generator (114) generates the standard DNN model using the optimal neural blocks. Further, the optimal DNN model generator (114) optimizes the standard DNN model by modifying the unsupported operations used for the execution of the task with the supported operations to generate the optimized DNN model.

The optimal DNN model generator (114) generates the optimized DNN model for executing the at least task based on the optimal neural blocks. The task executor (111) executes the task using the optimized DNN model.

In an embodiment, the optimal DNN model generator (114) maintains the truncated parameterized distribution is maintained over all the plurality of neural blocks at each layer that manifests the measure of the relative value of every neural block among the plurality of neural blocks subject to the hardware parameters and the task. Further, the optimal DNN model generator (114) performs the truncation operation to select the useful neural elements based on the IV, and the upper and lower confidence bounds for executing the task. Further, the optimal DNN model generator (114) represents the intermediate DNN model using the selected useful neural elements In an embodiment, the optimal DNN model generator (114) encodes the layer depth and the features of the neural blocks. Further, the optimal DNN model generator (114) creates the action space includes the set of neural block choices for every learnable block. Further, the optimal DNN model generator (114) performs the truncation operation to measure usefulness of the set of neural block choices. Further, the optimal DNN model generator (114) adds the abstract layer with the truncated choices of the set of neural block choices with the hardware parameters and the task. Further, the optimal DNN model generator (114) finds the expected latency for the set of neural block choices using the latency predictor metamodel. Further, the optimal DNN model generator (114) finds the expected accuracy after adding the set of neural block choices by sampling paths in the abstract layer for determining the quality of each neural block in the plurality of neural blocks.

In an embodiment, the optimal DNN model generator (114) instantiates the intermediate DNN. Further, the optimal DNN model generator (114) extracts constant values for the task and the hardware parameters based on the intermediate DNN. Further, the optimal DNN model generator (114) selects the optimal neural blocks from the plurality of neural blocks based on the quality of each neural block.

In an embodiment, the optimal DNN model generator (114) searches for the standard operations at the knowledge-base to replace the unsupported operations. Further, the optimal DNN model generator (114) replaces the unsupported operations with the standard operations, and retraining the neural block with the standard operations, when the standard operations are available. The optimal DNN model generator (114) optimizes the unsupported operations using the universal approximator such as Pade' Approximation Units (PAUs) for the task execution, when the standard operations are unavailable.

In another embodiment, the task executor (111) identifies the task to be executed in the electronic device (100). Further, the performance parameter estimator (112) estimates a performance threshold at the time of execution of the identified task. The performance threshold includes an accuracy threshold, a quality threshold of image, a latency threshold, a memory consumption threshold, a power consumption threshold, and a bandwidth threshold. The hardware parameters estimator (113) identifies an operation capability of the electronic device (100). The operation capability of the electronic device (100) includes the memory (120) of the electronic device (100), a screen refresh rate, a sampling rate, a camera resolution, a pixel density of a screen, a frame rate, a screen resolution, single/multiple display, an audio format support, a video format support, and an Application Programming Interface (API) support. The optimal DNN model generator (114) configures a pre-trained Artificial Intelligence (AI) model to select one or more neural blocks from a plurality neural blocks to optimize a performance of the task in the electronic device (100). In an embodiment, the one or more neural blocks are selected based on a quality of each neural block. In an embodiment, the quality of each neural block is determined using a probability distribution in the task execution.

Although the FIG. 3B shows the hardware components of the NAS controller (110) but it is to be understood that other embodiments are not limited thereon. In other embodiments, the NAS controller (110) may include less or more number of components. Further, the labels or names of the components are used for illustrative purposes and do not limit the scope of this disclosure. One or more components can be combined together to perform same or substantially similar function for executing the task using the optimized DNN model.

Figure 4:
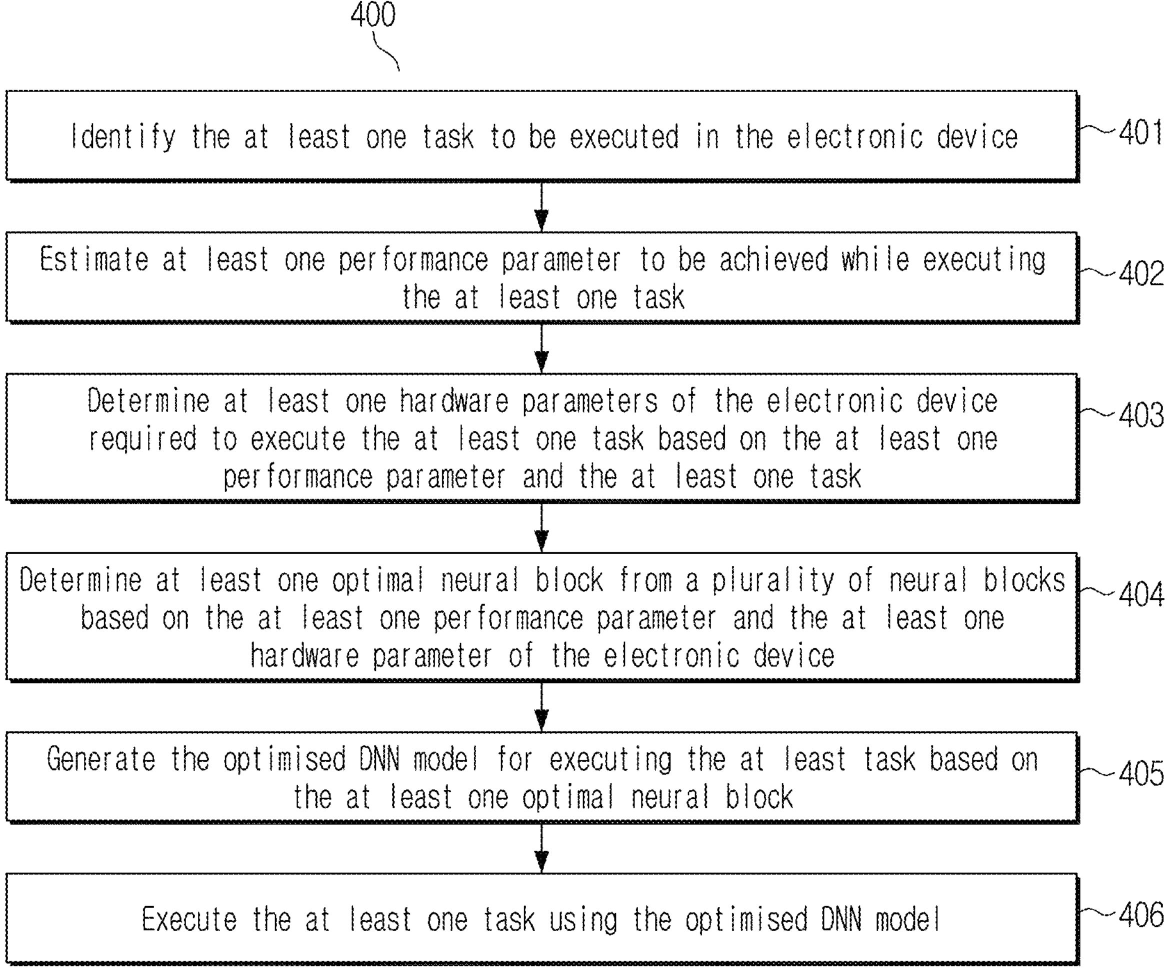
FIG. 4 illustrates a flow diagram illustrating a method for executing the task using the optimized DNN model, according to an embodiment as disclosed herein.

FIG. 4 illustrates a flow diagram 400 illustrating a method for executing the task using the optimized DNN model, according to an embodiment as disclosed herein. At step 401, the method includes identifying the task to be executed in the electronic device (100). In an embodiment, the method allows the task executor (111) to identify the task to be executed in the electronic device (100). At step 402, the method includes estimating performance parameter to be achieved while executing the task. In an embodiment, the method allows the performance parameter estimator (112) to estimate performance parameter to be achieved while executing the task. At step 403, the method includes determining the hardware parameters of the electronic device (100) used to execute the task based on the performance parameter and the task. In an embodiment, the method allows the hardware parameters estimator (113) to determine hardware parameters of the electronic device (100) used to execute the task based on the performance parameter and the task.

At step 404, the method includes determining the optimal neural blocks from a plurality of neural blocks based on the performance parameter and the hardware parameters of the electronic device (100). In an embodiment, the method allows the optimal DNN model generator (114) to determine optimal neural blocks from a plurality of neural blocks based on the performance parameter and the hardware parameters of the electronic device (100). At step 405, the method includes generating the optimized DNN model for executing the at least task based on the optimal neural blocks. In an embodiment, the method allows the optimal DNN model generator (114) to generate the optimized DNN model for executing the at least task based on the optimal neural blocks. At step 406, the method includes executing the task using the optimized DNN model. In an embodiment, the method allows the task executor (111) to execute the task using the optimized DNN model.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of this disclosure.

Figure 5:
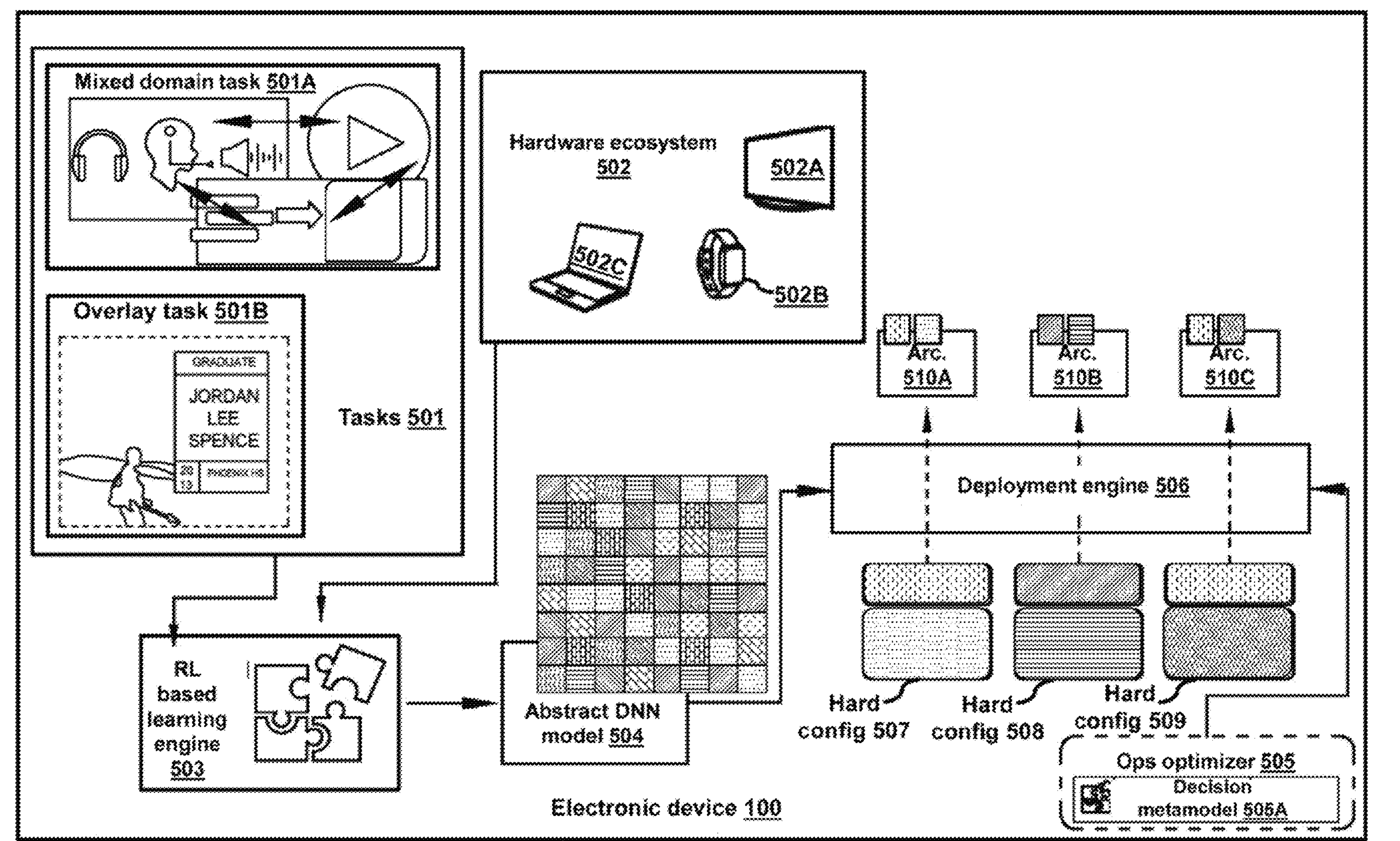
FIG. 5 illustrates an example scenario of executing two task using the optimized DNN model, according to an embodiment as disclosed herein.

FIG. 5 illustrates an example scenario of executing two task using the optimized DNN model (513), according to an embodiment as disclosed herein. The electronic device (100) includes a Reinforcement Learning (RL) based learning engine (503) to theoretical and programmatic formulate the abstract partial DNN model (504) by preserving multiple branches. The RL based learning engine (503) formulates the abstract partial DNN model (504) (i.e. the abstract template/architecture) based on the target tasks (501) to execute and the hardware configuration available to each device in a hardware ecosystem (502). Consider, the electronic device (100) is to execute two tasks (i.e. mixed domain task (501A) and overlay task (501B)) and the hardware ecosystem (502) includes 3 target devices, i.e. a smart TV (502A), a smart watch (502B), and a laptop (502C) with different hardware configurations. The deployment engine (506) of the electronic device (100) optimizes the abstract partial DNN model (504) based on the first task (i.e. mixed domain task (501A)), the first hardware configuration (i.e. Hardware config (507)) and an input from an operation (Ops) customizer/optimizer (505). The operation optimizer (505) provides input to the deployment engine (506) by optimizing the unsupported operation in the abstract partial DNN model (504) using a decision meta-model (505A).

The unsupported operation is optimized by replacing the unsupported operation with supporting operations to perform the first task with the first hardware configuration. Further, the deployment engine (506) generates the DNN architecture (513A) suitable for executing the first task with the first hardware configuration, in response to optimizing the abstract DNN model (504). Similarly, the deployment engine (506) generates the DNN architecture (513B) suitable for executing the second task (i.e. overlay task (501B)) with the second hardware configuration (i.e. Hardware config (508)), in response to optimizing the abstract DNN model (504). Similarly, the deployment engine (506) generates the DNN architecture (513C) suitable for executing the first task with the third hardware configuration (i.e. Hardware config (509)), in response to optimizing the abstract DNN model (504).

The abstract DNN model (504) is a new type of a partial Artificial Intelligence (AI) model that encodes the plurality of neural blocks in each layer i.e. the model itself preserves and encodes multiple possible branches. Thus, any traversal and selection of a particular branch or a path results in a traditional DNN. The selection of a block from the plurality of blocks is delayed till a time the abstract DNN model (504) is actually put into use for first time on the electronic device (100). The delayed selection method is termed as instantiation. An existing DNN model is a singular choice of a neural block at each layer/stage. In certain embodiments, various architecture learning approaches in NAS are able to learn deep AI models with singular neural blocks are each layer/stage. Selection of branches/paths to construct the final standard DNN from the abstract partial model happens when the abstract model is put into the electronic device (100) before being used for the first time for a real task, which is done via a deployment engine (506). The deployment engine (506) is a part of the electronic device (100) for delayed selection of branches on the actual device.

Fundamental steps in the LazyNAS method includes representing the abstract DNN architecture (504), learning the abstract DNN architecture (504), dynamic deployment of the abstract network (504) onto the target devices. In representing step, the electronic device (100) theoretically represents the abstract DNN (504) at every layer/step and stores all possible choices. But representing step results in an intractably large network. Thus, the electronic device (100) stores most useful choices based on information content. The electronic device (100) maintains a truncated asymptotically infinite distribution over choices, such that choices can be added later without changing a distribution type. For learning step, a novel method for searching (via Multi-criteria smooth policy gradient RL) is proposed as well as new technique for backpropagation in such abstract architecture such as the abstract DNN (504).

Instantiation is the key step in the dynamic deployment step. Dynamic deployment step includes a dynamic deployment of the abstract network (504) onto the target devices via an information maximization given hardware/task parameters.

Selection of the neural blocks among the plurality of blocks is the basic concept behind the NAS itself. Unlike traditional NAS fundamentals, the LazyNAS includes 2 logical phases, i.e. a learning phase and a deployment of making an AI model work for a given task. During the learning phase, the architecture or the parameters of a particular model are learned based on the task and other requirements. During the deployment phase, the model is prepared to ready for a particular (set of) devices, performing any additional transformations, and actually putting the abstract DNN model (504) in use on an intended platform (Neural SDK or actual devices) and the particular task such that inference/prediction can now be performed on real tasks.

Unlike traditional NAS, the proposed method (i.e. LazyNAS), will not make the selection among the plurality of blocks at a time of learning. The proposed method allows to learn a new kind of template/abstract model (i.e. abstract DNN (504)) that preserves the plurality of blocks. The operation optimiser uses the RL based NAS adaptation to update/modify the DNN by selecting/replacing operations (short for operations viz-a-viz 'transformation functions') with the most suitable ones given the hardware and task requirements. The operation optimiser (505) is coupled both with the LazyNAS to produce optimized abstract networks (513) as well as with a vendor/partner pipeline who can suggest the DNN models that are incompatible with the target hardware.

In AI and Machine Learning (ML) terminology, Lazy refers to a class of methods that does not build a final usable model at the time of learning. A Lazy model either collects statistics from data (such as Nearest Neighbor model) or creates a partial model such as a probabilistic logic models. The Lazy model usually perform certain extra steps to convert the partial model into the final usable model before an inference. In the proposed method, at the learning phase, the NAS framework learns a partial intermediate abstract model (504). When the partial intermediate abstract model (504) inserts onto the electronic device (100) for performing an intended task. The electronic device (100) performs extra steps and reduces the plurality of neural blocks into the most optimal singularity by selecting the most appropriate branch at each layer. Thus, the actual AI model instance creation is delayed until before the inference is performed for the first time in the electronic device (100).

The proposed method helps to reduce developer efforts even though different network for different device are available for better performance. With the LazyNAS a subset of the network with a subset of operations will be additionally added to the network. The single network will be optimal on all devices and all computing units. This will reduce developer efforts to learn different models for different devices to get better performance on all devices. Generally, a significant productivity improvement is used to get a desired output.

In an embodiment, of the plurality of modules may be implemented through the AI model. A function associated with AI model may be performed through the memory (120), and the processor (130).

The processor (130) may include one or a plurality of processors. At this time, one or a plurality of processors may be a general-purpose processor, such as a Central Processing Unit (CPU), an Application Processor (AP), or the like, a graphics-only processing unit such as a Graphics Processing Unit (GPU), a Visual Processing Unit (VPU), and/or an AI-dedicated processor such as a Neural Processing Unit (NPU).

In an embodiment, the one or a plurality of processors control processing of the input data in accordance with a predefined operating rule or AI model stored in the memory (120). The predefined operating rule or AI model is provided through training or learning.

Here, being provided through learning means that, by applying a learning method to a plurality of learning data, a predefined operating rule or AI model of a desired characteristic is made. The learning may be performed in the electronic device (100) itself in which the AI according to an embodiment is performed, and/o may be implemented through a separate server/system. The learning method is a method for training a predetermined target device (for example, a robot, the electronic device (100) using a plurality of learning data to cause, allow, or control the target device to make a determination or prediction. Examples of learning methods include, but are not limited to, supervised learning, unsupervised learning, semi-supervised learning, or reinforcement learning.

The AI model may include a plurality of NN layers. Each layer has a plurality of weight values, and performs a layer operation through calculation of a previous layer and an operation of a plurality of weights. Examples of NNs include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

Figure 6:
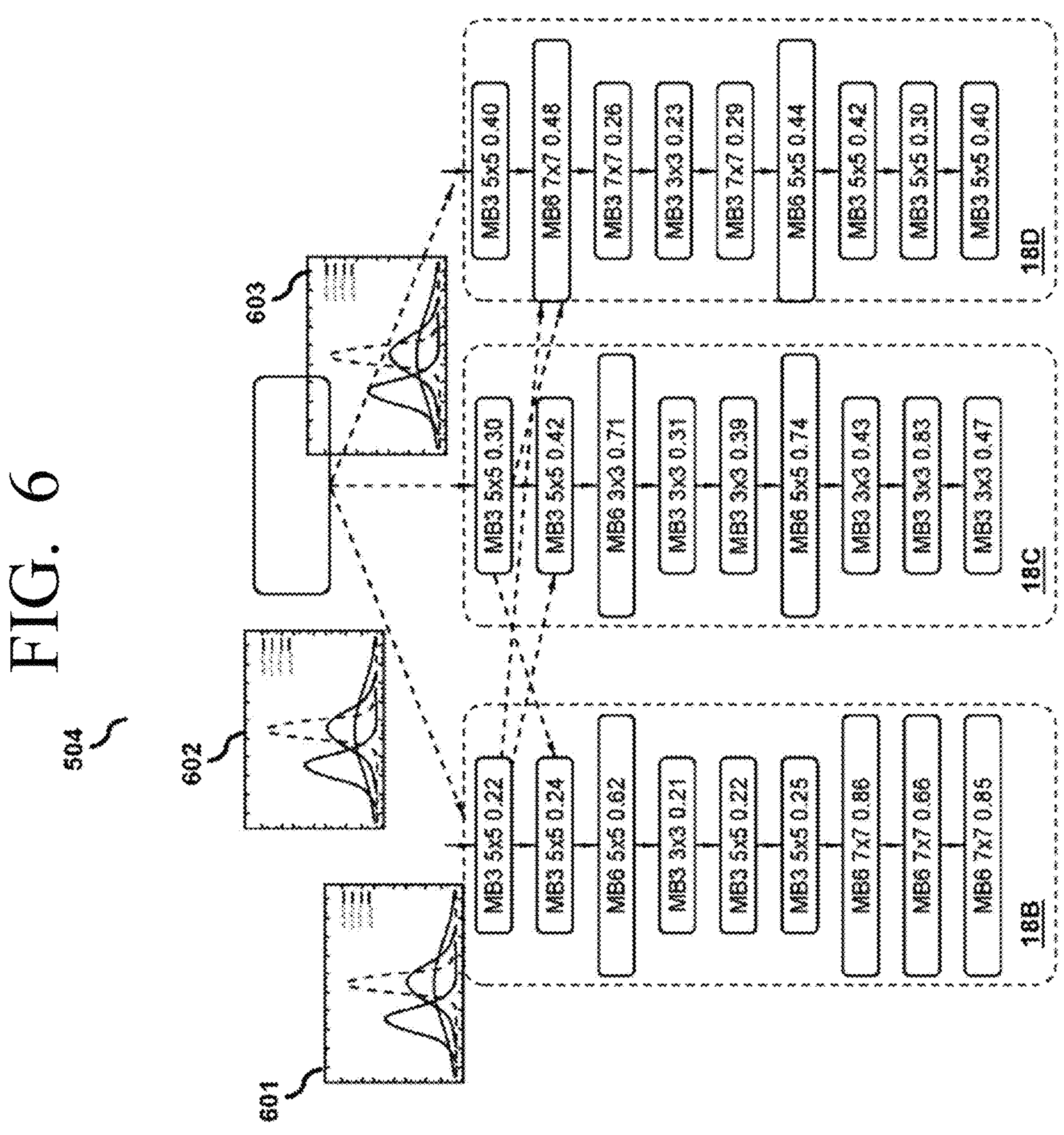
FIG. 6 illustrates a representation of an abstract DNN model, according to an embodiment as disclosed herein.

FIG. 6 illustrates a representation of the abstract DNN model (504), according to an embodiment as disclosed herein. In the domain of the AI and the ML, the representation indicates a way any DNN model itself is encoded both mathematically and programmatically. For example, a linear regression models are encoded as an equation of a hyperplane, decision trees are represented as hierarchical partitions of an input space. The neural models are represented as directed acyclic graphs where each node represents a mathematical transformation function and an edges indicate flow of partial values. The LazyNAS allows the electronic device (100) to learns a new type of neural model that keeps all different possible branches (18B, 18C, 18D) like a class of multiple models that share commonalities.

The proposed representation of the abstract DNN (504) persists a most useful set of choices at every abstract layer by designing a metric/measure for information content of the layer choices. The abstract DNN (504) cannot use a standard representation language like traditional DNNs, since the abstract DNN (504) is a template/combination over multiple potential DNNs. Thus, each layer of the abstract DNN (504) is has more than one neural block i.e. plurality of choices at every step. Such plurality of choices of neural components can be many, at times infinite. It is neither tractable nor efficient to maintain all possible choices at each layer. Thus, it is only natural that at any layer, a smaller set of most relevant and most useful choices can find and persist them in the abstract model (504). Most relevant set of choices are determined by some designing some measure of an information content of the choices that is to be included or excluded from the in the set.

For example, a measure of usefulness of the choices or the neural blocks. An information content signifies an amount of information a choice adds or deducts when added or removed from a model. One example is a mutual information metric or an entropy. The information content can be used to measure the usefulness of candidate neural blocks that are to be included in the set of neural block choices at each layer. i.e. usefulness/ranking of the plurality of branches (18B, 18C, 18D). The dotted arrows in the FIG. 6 indicate to the plurality of neural blocks or branches (18B, 18C, 18D). Limited number of branches are traversing in one path in the abstract model (504) that actually produces the standard DNN, where each branch indicates a way to intend to persist most useful branches. The example distributions (601, 602, 603) on top of each layer indicate the measure of the usefulness. The distributions (601, 602, 603) are computed using the information content.

A truncated asymptotically infinite distribution (601, 602, 603) is maintained over the choices, which makes the abstract DNN (504) flexible for later addition of more choice. The abstract model (504) has plurality of neural blocks at each layer of the multiple branches (18B, 18C, 18D) by defining, learning and storing the probability distribution (601, 602, 603) over the branches (18B, 18C, 18D) in each layer in the abstract DNN (504). Such distribution (601, 602, 603) can either be discrete and finite over a fixed set of choices in the set or can be an asymptotically infinite distribution (601, 602, 603) over potentially infinite choices. For example, a Gaussian distribution is an asymptotically infinite distribution. The branches (18B, 18C, 18D) are not fixed and increase or decrease while learning. So, the discrete finite probability distribution is not useful, but the infinite distributions (601, 602, 603) is useful. For keeping the efficiency, instead of maintaining the asymptotic tails of the Gaussian distribution, the asymptotically infinite distribution (601, 602, 603) is truncated. For example, the Gaussian distribution is usually truncated by choosing a range between positive and negative confidence intervals.

The representation is an efficient way to store the abstract DNN (504) and allow for learning the abstract DNN (504). The representation of the abstract DNN (504) is a new way to represent commonality between distinct specialized architectures.

Figure 7:
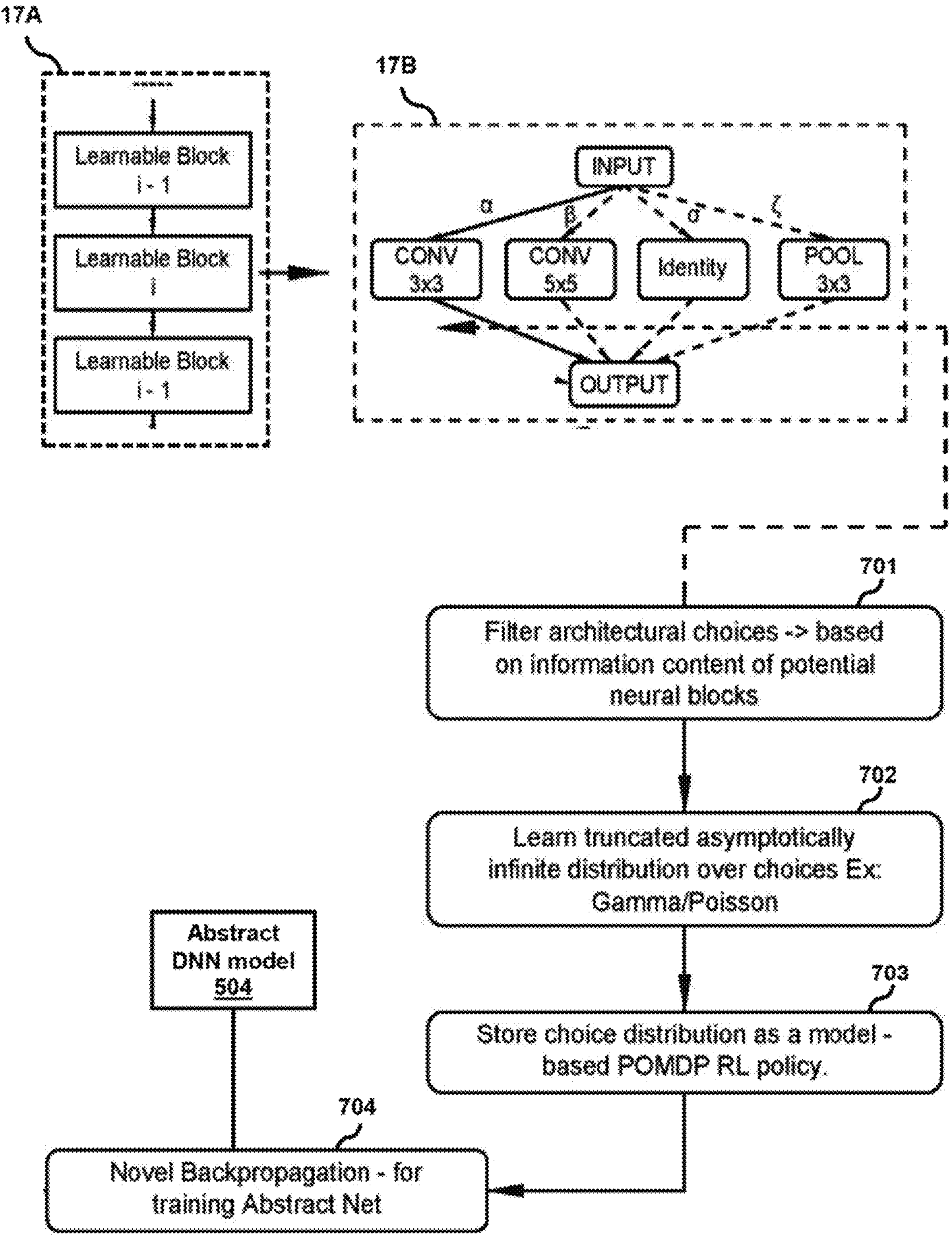
FIG. 7 illustrates a flow diagram that includes steps for learning the abstract DNN model, according to an embodiment as disclosed herein.

FIG. 7 illustrates a flow diagram that includes steps for learning the abstract DNN model (504), according to an embodiment as disclosed herein. At step 701, the electronic device (100) filters the architectural choices based on the information content of the potential neural blocks (or potential layers) in the representation of the abstract DNN (504). At step 702, the electronic device (100) learns the truncated asymptotically infinite distribution (e.g. Gamma distribution, Poisson distribution) (601, 602, 603) over the choices. At step 703, the electronic device (100) stores the choice distribution (601, 602, 603) as a model-based Partially Observable Markov Decision Process (POMDP) RL policy. At step 704, the electronic device (100) performs the backpropagation for training the abstract DNN (504) using a new gradient update policy.

In RL, a model-based POMDP means the methods which explicitly computes a probability of moving to a new state s1 when an action a0 is performed on the previous state s0. The model-based POMDP RL approach is used for learning the abstract model (504) in the proposed method. So, the probability of moving to the new state s1 is determined when the action a0 is performed on the previous state s0, to compute and retain the usefulness of the neural block choices in the abstract DNN (504).

In an embodiment, a multi-criteria smooth model-based policy gradient is used for the abstract architecture learning. As soon as starting the learning of the abstract architecture such as the abstract DNN (504), the state space becomes partially observable. So, the POMDP based representation can be considered.

In an embodiment, RL problems are mathematically formulated as a Markov Decision Process (MDP). However, a traditional MDP assumes that all aspect features of the environment are visible/observable. In most real cases, not all features of the environment are observable, which are termed as partially observable. The RL problems in such scenarios use the POMDP as the mathematical formulation.

Any RL method optimizes some objective such as prediction quality or speed. Multi-criteria are the class of RL methods jointly optimizes multiple objective functions. The method allows to maximize a predictive performance, minimize a latency, minimize a computational load, minimize a memory footprint and so on together. 'Smooth' indicates functions that are smooth. Smooth is a function that is differentiable in an entire domain of the function (i.e. a concept from calculus). The policy in the RL refers to the mapping from the state to the action that should be taken in a particular state (i.e. particular condition of the environment). A policy gradient is a class of RL solution approaches, where an expected reward (i.e. expectation is a mathematical expression from the field of statistics that is similar to averaging) should maximize for a parameterized policy. The parameterized policy means a policy that is expressed as function of other variables.

Unlike existing methods, the proposed learning method allows to maintain sparsity in the abstract DNN (504). Further, the proposed learning method can be used for adaptation of backpropagation to train on the abstract architectures such as the abstract DNN (504).

Figure 8:
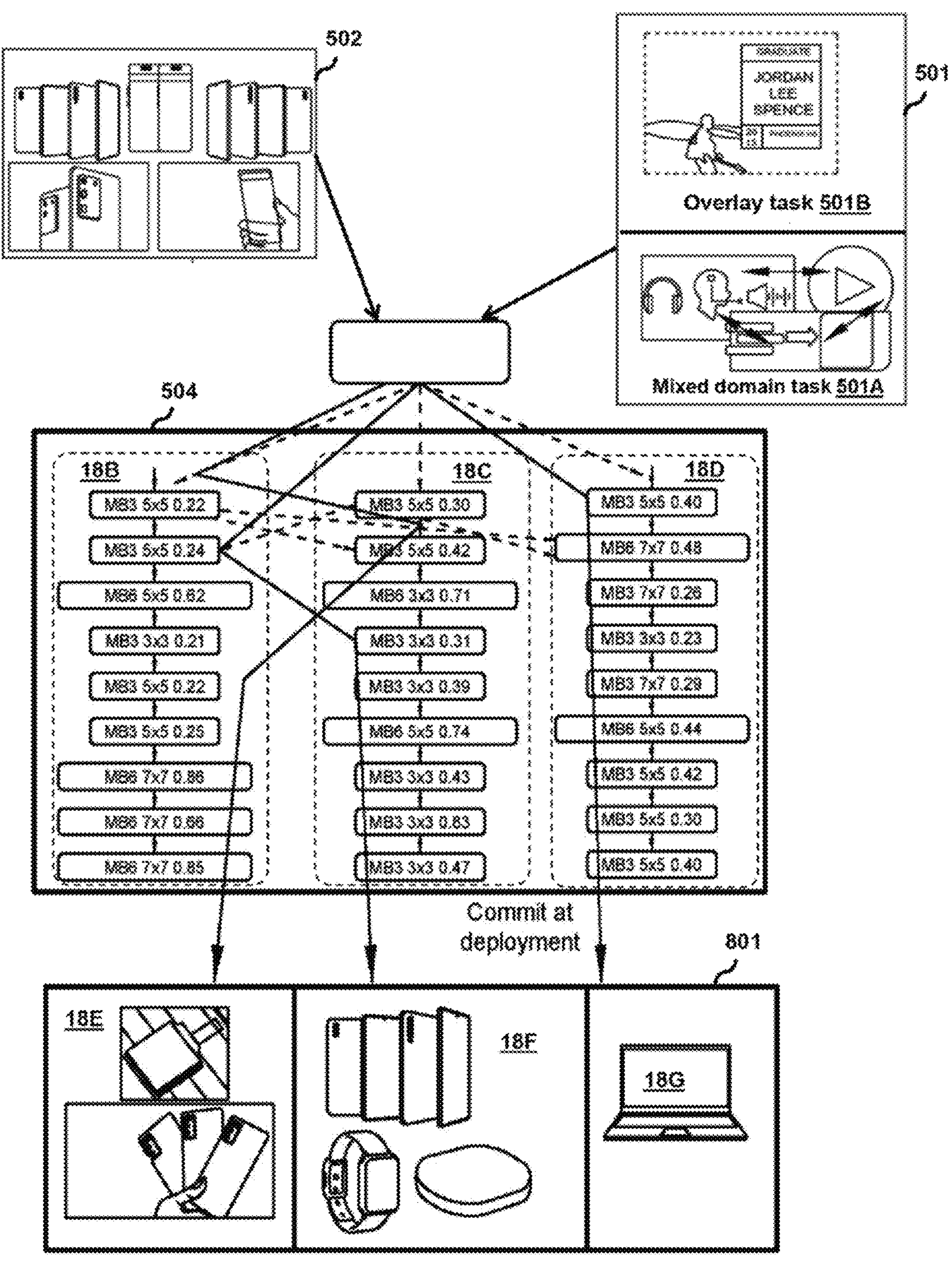
FIG. 8 illustrates deployment of the abstract DNN model onto a target device, according to an embodiment as disclosed herein.

FIG. 8 illustrates deployment of the abstract DNN model (504) onto the target device (801), according to an embodiment as disclosed herein. Dynamic instantiation of the abstract DNN (504) on to the target device (801) (i.e. 18E, 18F, and 18G) for the target task (501) is shown in the FIG. 8. The target tasks (501) includes the overlay task (501B) and the mixed domain task (501A).

In an embodiment, the instantiation is converting the abstract DNN (504), that has multiple branches (18B, 18C, 18D), to an actual DNN (i.e. optimized DNN (513)) which is able to perform inference for the intended use case on real data, based on the given target task (501) or task parameters, and target hardware or hardware parameters of the target device (801) on which it is being deployed. In another embodiment, the instantiation is converting the partial abstract model, with plurality of neural blocks in each layer, into a standard DNN with singular neural blocks at each layer by selection the most appropriate branch/path (18B, 18C, 18D). A notion is similar to instantiation of a class to construct an object given the input parameters.

The abstract networks are parameterized, i.e. the abstract networks can be designed as functions that can accept arguments such as hardware parameters/task parameters etc. and output an instance DNN. Further, the method allows for maintaining common abstract architecture. Deployment time instantiation results in a best possible instance DNN architecture based on nuances of the target device (801) where it is being deployed.

In an example scenario, consider a hardware ecosystem (502) of mobile devices, which are Flagship, Mid-tier, low-tier, tablets etc. Some Deep AI model developed for flagship devices, for a complex use case embedded caption understanding on images (multi-modal task), may not perform (or as a whole may not run) on other types of devices such as mid-tier or low-tier. These different classes of devices may have different hardware configurations or different quality requirements. Flagship may have advanced compute units or higher memory for heavier matrix/tensor computations whereas low-tier mobiles have different configurations. Thus, it is very important to have different DNN architectures for different classes of devices and for quality requirements. NAS/AutoML gives the tools and techniques to generate deep architectures. However, all the existing approaches generate DNN architectures with singular choices at each layer. That means, the existing approaches commit to a branch during learning. This results in distinct and separate development pipelines for learning the DNN architecture for different device hardware configurations and different quality requirements. For instance, a separate architecture learning for the flagship devices or for tablets for the same use case, mentioned earlier. This creates the following major limitations:

1) If the same model is used in all tiers of devices they will either fail to exhibit required accuracy or may not run at all.

2) If different architecture learning pipelines are used for different devices, it is a significant wastage of both engineering effort, computational resources and time The proposed method will design one abstract architecture such as the abstract DNN (504) (which has multiple branches (18B, 18C, 18D) with plurality of neural blocks and operations encoded into the same partial model) for all devices and all task requirements. During actually putting the model in use for the example scenario onto the specific device(s), the deployment engine (506) identifies the parameters of the device and the task/quality requirements, and selects a particular block among the multiple choices at every layer and produce a final "instance" DNN (513) that is most suitable for that target device (801) and quality/task requirements. Intuitively the abstract architecture such as the abstract DNN (504) is like multiple possible paths/branches (18B, 18C, 18D) that exist together. The deployment engine (506) selects (i.e. commits) one of the many potential paths/branches (18B, 18C, 18D) at the end.

Figure 9:
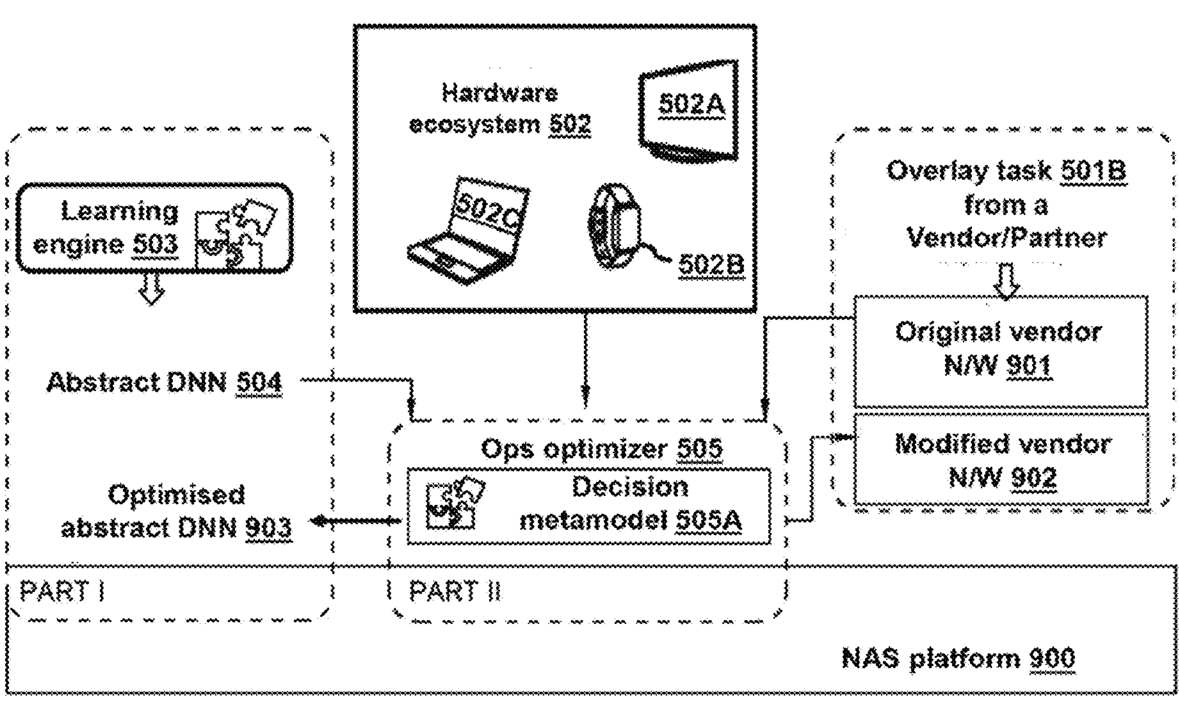
FIG. 9 illustrates an example scenario of customization of operations using a NAS platform, according to an embodiment as disclosed herein.

FIG. 9 illustrates an example scenario of customization of the operations using a NAS platform (900), according to an embodiment as disclosed herein. The NAS platform (900) of the electronic device (100) performs a part 1 and part 2 steps. In the part 1, the electronic device (100) generates the abstract DNN (504) based on the tasks to execute using the hardware configurations of the devices ((502A)-(502C)) in the hardware ecosystem (502). In the part 2, electronic device (100) customizes the abstract DNN model (504) using the operation optimiser (505) by replacing the unsupported/incompatible operation of the abstract DNN (504) with most suitable operations for executing the tasks using the hardware configurations. The operation optimiser (505) deploys the customized network (902) for the vendor/partner, where the customized network (902) is optimal for the given hardware configurations as well as maintains similar/better predictive performance. Further, the operation optimiser (505) predicts the candidate alternative operation using the decision metamodel (505A) that have been learned over-time from the execution data. In case no suitable alternative operation is found, the operation optimiser (505) provides the custom universal approximator, such as PAUs for replacing the incompatible operation in the abstract DNN model (504). Thus, the proposed method reduces a drop ratio occurs due to operation incompatibility issues to a significant amount (e.g. less than 10%) and engineering effort needed for implementing incompatible operations.

Figure 10A:
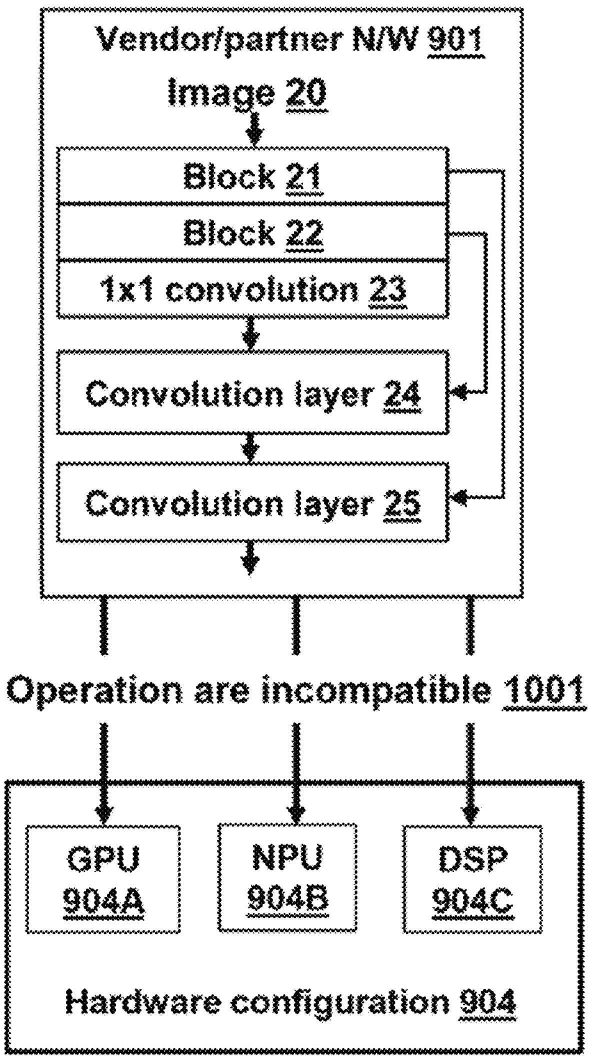
FIGS. 10A-10B illustrate a comparison of operation compatibility in an existing method and the proposed method, according to an embodiment as disclosed herein.
Figure 10B:
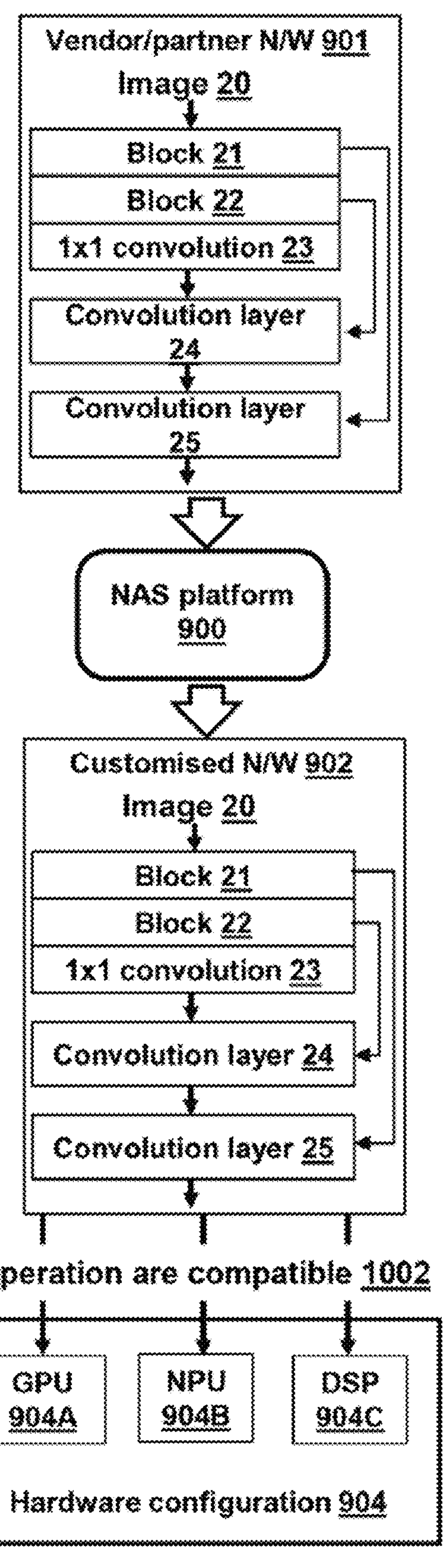

FIGS. 10A-10B illustrate a comparison of operation compatibility in an existing method and the proposed method, according to an embodiment as disclosed herein. Consider, the vendor/partner network (901) includes multiple operations (.e. block (21), block (22), convolution layer (24), convolution layer (25)) for processing an image (20). Neural processing Unit (NPU) (904B), Digital Signal Processor (DSP) (904C), and Graphics Processing Unit (GPU) (904A) etc. are the hardware configurations (904) available for the performing the multiple operations. Consider, the multiple operations are incompatible (1001) to hardware configurations (904). According to the existing method, the image processing using the hardware configurations (904) will not be optimized due to the incompatibility of operations as shown in the FIG. 10A.

As shown in the FIG. 10B, the proposed NAS platform (900) customizes the (901) incompatible operations of the vendor/partner network (901) for the given hardware configuration (904) with the most suitable alternate operations based on the hardware configurations (904). Further, the NAS platform (900) re-trains a customized network (902) for a vendor/partner with most suitable operations. The NAS platform (900) provides certain universal approximators (e.g. PAUs) incase suitable alternative operations are not found among the known operations. The NAS platform (900) uses the decision metamodel (505A) for predicting the most suitable operations given the current vendor DNN (901), the hardware parameters and the task that also indicates required precision. The NAS platform (900) learns over time, and builds the decision metamodel (505A) for operations compatibility/suitability (1002) for varied range of hardware and task parameters. The NAS platform (900) inserts the most suitable operations in the customized network (N/W) (902), where the suitability/compatibility is estimated by predictive performance constrained by how well the operations can be executed in the given hardware configuration (904).

FIG. 11 illustrates customization of the abstract DNN model (504) with compatible alternate operations, according to an embodiment as disclosed herein. Consider, the abstract DNN (504) include 4 steps to process to covert the image 20 to the logits (504A), whereas original operations (1101) includes a Maxout operation and a ELU operation of the steps are unsupported to the hardware configuration (904). A controller (905) of the NAS platform (900) learns the decision metamodel (505A) over time from execution stats of DNN execution on devices/compute-units etc. The controller (905) uses the decision metamodel (505A) to infer the best candidate/alternative operations (1102) to replace the unsupported operation in the abstract DNN (504). Further, the controller (905) evaluates suitability of the best candidate operations (1102) based on a performance, a hardware compatibility, an efficiency and a task precision. When the suitable known alternative operations (1102) are not found for attaining the given accuracy/efficiency, the controller (905) inserts the universal approximators such as the PAUs or other power series approximations to the unsupported operations in the abstract DNN (504) and generates the optimal DNN (513). A trainer 906 of the NAS platform (900) retrain layer=i for which the replacement was made. Objective function is ($|O_{old}-O_{new}|$), where $O_{old}$ is the output of the original layer and $O_{new}$, is the output of the modified layer. As shown in the FIG. 11, the Maxout and the ELU are the unsupported operations for the NPU (904B) in a final instance deployable model (i.e. the optimized DNN (513)). The controller (905) of the NAS platform (900) replaces the Maxout and the ELU with the PAUs that is supporting by the NPU (904B) for the deployment.

Figure 12A:
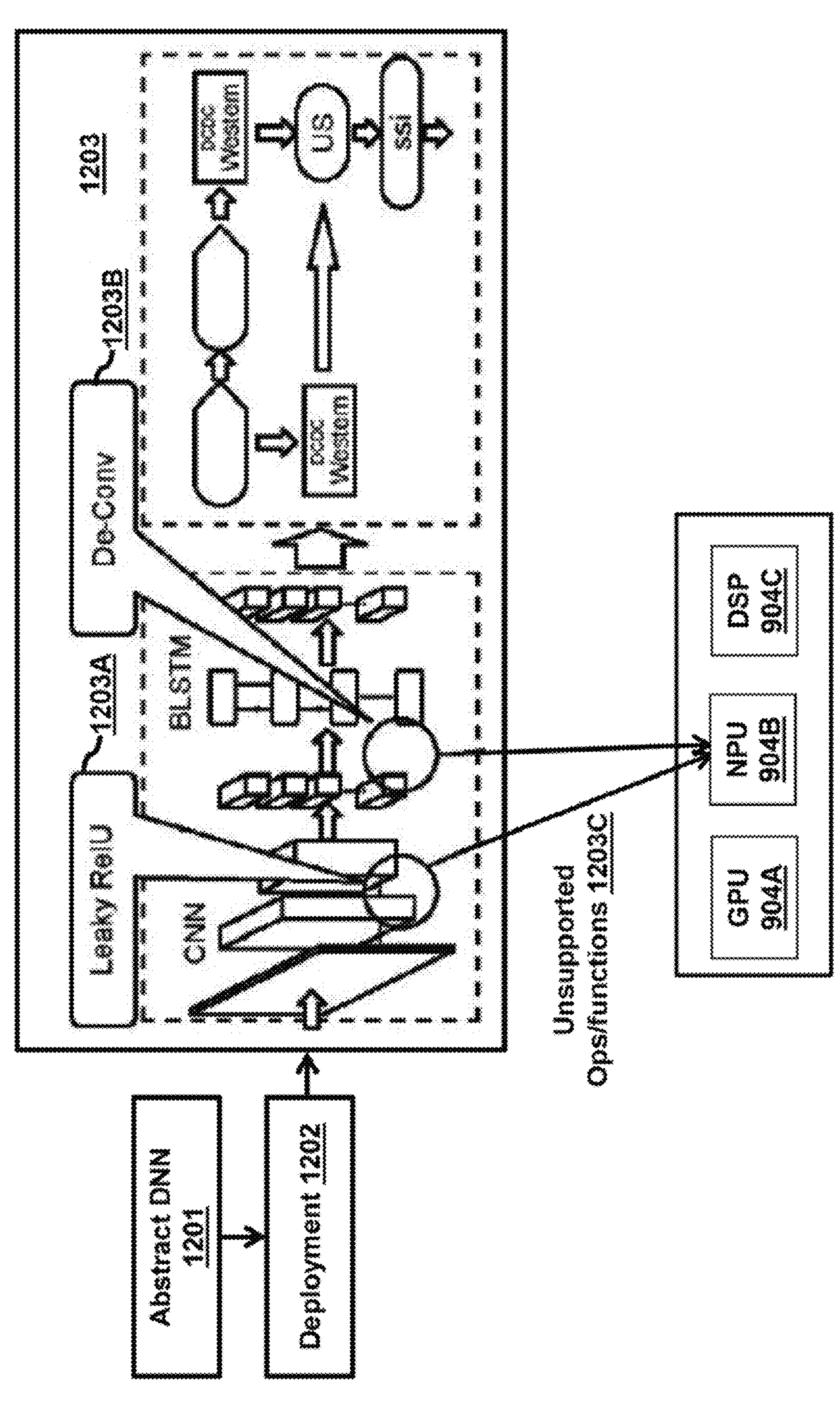
FIGS. 12A-12C illustrate an overall schematic diagram of a coupled framework, according to an embodiment as disclosed herein.
Figure 12B:
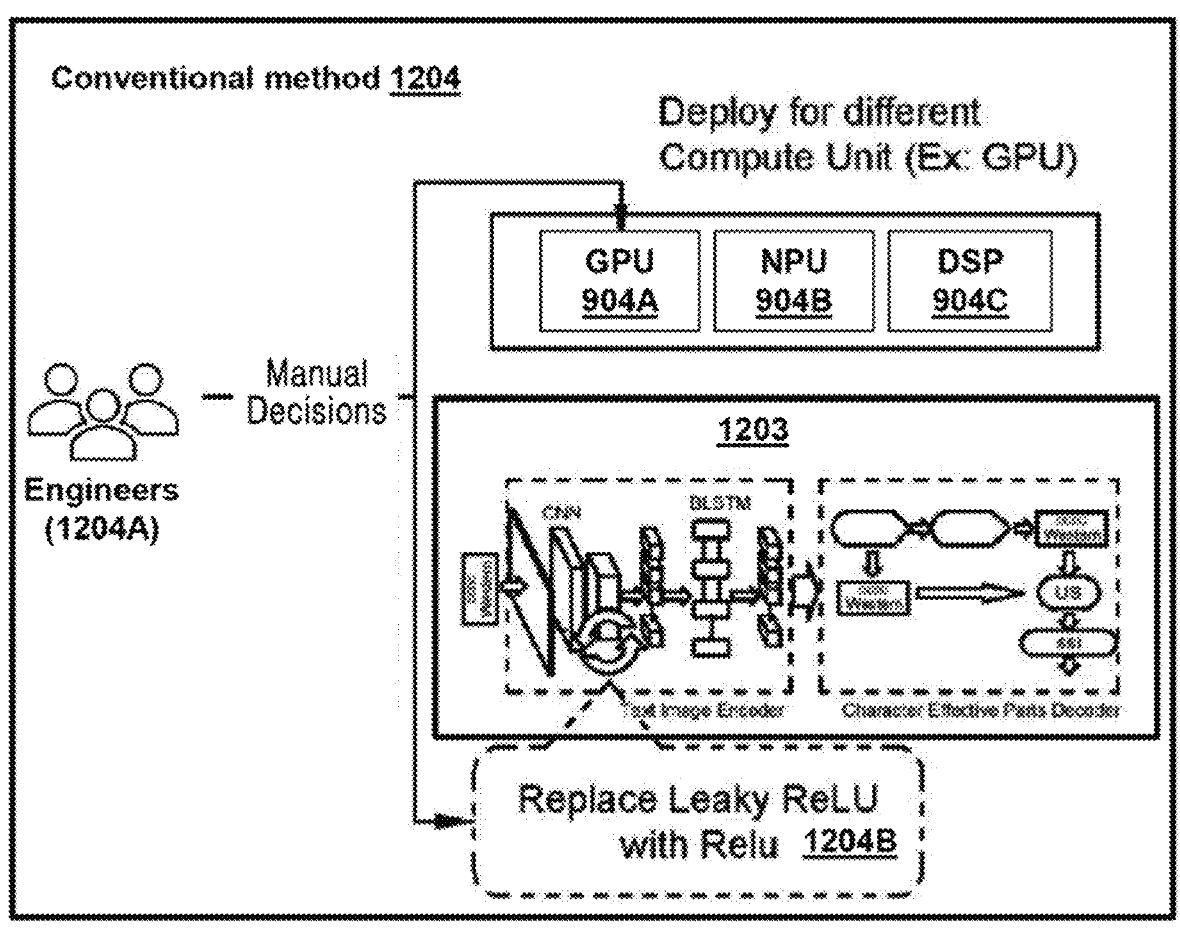
Figure 12C:
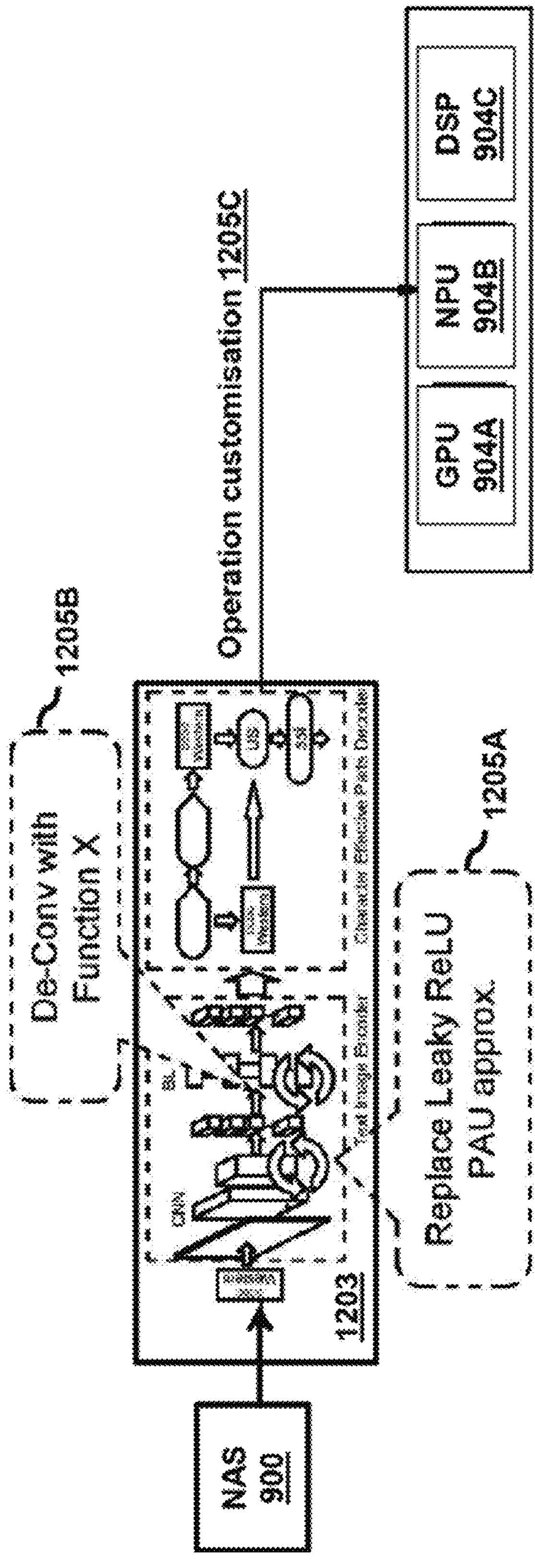

FIG. 12A-12C illustrates an overall schematic diagram of a coupled framework, according to an embodiment as disclosed herein. The coupled framework is a collaboration of the LazyNAS method for generating the abstract DNN model (504) and the customization of the unsupported operation in the abstract DNN model (504). As shown in the FIG. 12A, the electronic device (100) represents (1201) the abstract DNN model (504) based on the task that is to be executed using the available hardware configuration (i.e. GPU (904A), NPU (904B), DSP(904C)) of the electronic device (100). The electronic device (100) deploys (1202) the abstract DNN model (504) for executing the task. The deployment model is shown in the notation (1203). The electronic device (100) detects (1203C) that a Leaky ReLU operation (1203A) and a deconvolution operation (1203B) in the abstract DNN model (504) as the unsupported operations for the NPU (904B) of the electronic device (100), while deploying the abstract DNN model (504).

A conventional method (1204) of solving the aforementioned problem in shown in the FIG. 12B. In the conventional method (1204), the developers/engineers (1204A) manually find out the operations (1204B) that are suitable to replace the unsupported operations (1203A, 1203B) in the hardware configuration, which results in high latency and low accuracy in the deployment. Unlike conventional method, the proposed method allows the electronic device (100) to customize the unsupported operation (1203A, 1203B) in the abstract DNN model (504) using the decision metamodel (505A) as shown in the FIG. 12C. Further, the electronic device (100) intelligently finds the PAU approximator (1205A) as the suitable operation for replacing the Leaky ReLU operation (1203A). Further, the electronic device (100) intelligently finds a Function X (1205B) as the suitable operation for replacing the deconvolution operation (1203B). Further, the electronic device (100) generates the optimal DNN model (513) by performing the operation optimization (1205C) i.e. replacing the unsupported operations (1203A, 1203B) for the NPU (904B) with the supported operations (1205A, 1205B). Further, the electronic device (100) uses the optimal DNN model (513) for the deployment with low latency and high accuracy.

FIG. 13A illustrates a flow diagram that includes steps performed by the RL based learning engine (503), according to an embodiment as disclosed herein. The state (St) of an environment (1310) represents a current abstract model encoding (i.e. layer depth and features of neural blocks). The action space (A1) of an agent (1309) represents a set of neural block choices for every learnable block. The steps performing by the RL based learning engine (503) are described as follows:

Step 1: Choose the action space (A1): Neural block choices

Step 2: For layer i→Information Value (IV) to measure usefulness of neural block choices (i.e. truncation).

$$IV(choice_x) = \sum_{i=1}^{n}\left((\%\ pos_i - \%\ rec_i) \times \left(\%\ \frac{pos_i}{\%\ rec_i}\right)\right) \Rightarrow \text{Set of choices } A$$

Set of choices B←{x: LowerConfidenceBound ≤π(x|s) ≤UpperConfidenceBound}

Final truncated choices: N=A∩B

Step 3: Add the abstract layer i with the truncated choices set N . . . with its parameterized probability distribution $\pi_i(N)=F(X, \lambda, \alpha, \beta)$, where the parameter X is the feature set describing the hardware configuration/task Step 4: Find expected latency for the choice set using the latency predictor metamodel 'M'

$$E_{\pi_i(n)}[M(N)]$$

Step 5: Weight update of abstract candidate network D

Step 6: Find expected accuracy after adding Neural choice set N by sampling paths in the abstract model $$\sum_{j=1}^{i}\prod_{j}\pi_j \times Acc(\text{layer } 1 \ldots j)$$

Step 7: Update Q function MLP F(θ): $\theta^{t+1}=\theta^t+\eta\nabla_F$, where $\nabla_F$ is the gradient of the function approximator model.

Step 8: Update policy, where the optimal policy is given by $$\pi_i^* = softmax_{a\in N}(Q_i^*(s, a) + \epsilon_t\Phi_t(s, a)),$$

where $\Phi_t$ is the shaping function. The shaping function is expressed as:

$$\Phi_{t+1}(s, a) = \Phi_t(s, a) + \beta\delta_t^{\Phi} \text{ and } \delta^{\Phi} = R^{\Phi}(s, a) + \gamma\Phi(s', a') - \Phi(s, a),$$

$$\text{where } \epsilon_t = \begin{cases} \epsilon_{t-1} \times e^{\Delta}, & \epsilon > \text{threshold} \\ 0, & \text{otherwise} \end{cases}, \text{ and}$$

$$\Delta = Accuracy_t - Accuracy_{t-1}$$

The shaping function encodes the latency and device hardware related metrics, For example: $R^{\Phi}$=Latency. The RL based learning engine (503) continues to perform from step 1 after completing the step 8.

In an embodiment, the steps performing by the RL based learning engine (503) are described as follows. At 1301, the electronic device (100) obtains all possible neural choices [3×3 Cony, 5×5 SepCony, Non-linearities, Residuals, Recurrent memory blocks, skip connections (identity layers)]. At 1302, the electronic device (100) determines an expected return over choices, which is the action space (A1). At 1303, the electronic device (100) stores all branches with the distribution. At 1304, the electronic device (100) identifies the tasks to execute on using the hardware ecosystem. At 1304A, the electronic device (100) determines the reward (Rt) from the environment (1310) to the agent (1309) based on the tasks and the hardware ecosystem using the device outcome predictor meta-model. At 1305, the electronic device (100) generates the abstract DNN model (504) (i.e. state space (St)) for the hardware ecosystem to execute the tasks. At 1306, the electronic device (100) learns the weight required for the abstract DNN model (504). At 1307, the electronic device (100) computes an expected performance accuracy (i.e. the reward (Rt)) of sample instance DNNs. At 1307, the electronic device (100) determines the Q function approximator based on the expected performance accuracy and the possible neural choices available.

Figure 13B:
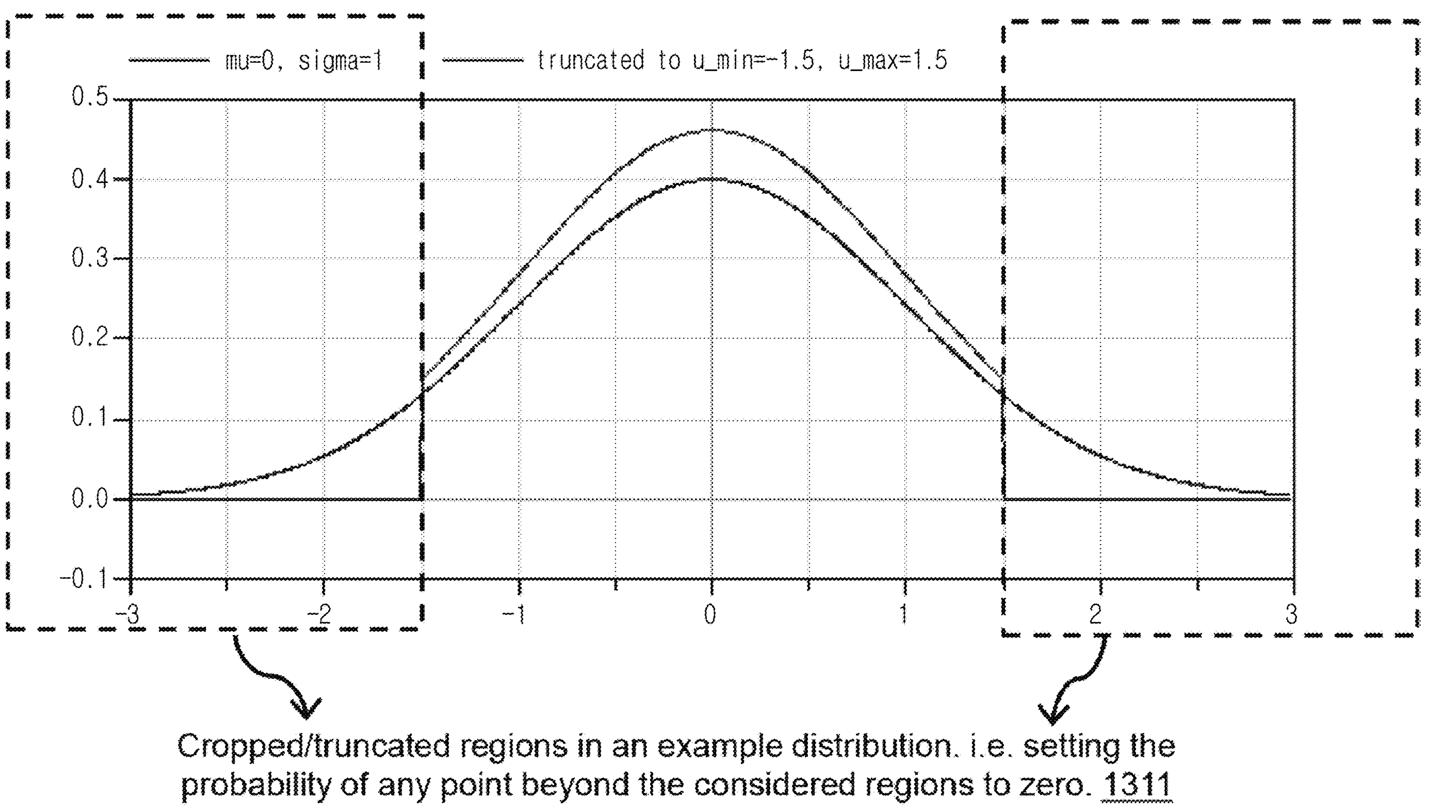
FIG. 13B illustrates a graphical diagram of densities of a normal distribution, according to an embodiment as disclosed herein.

FIG. 13B illustrates a graphical diagram of densities of the normal distribution, according to an embodiment as disclosed herein. The truncation (i.e. step 2 in FIG. 13A) refers to choosing and persisting the choices that occupy the high probability regions in the distribution (1311), thus cropping the asymptotically low probability regions or tails.

The truncation has 2 steps:

Computing the IV and choosing top-k

Using the upper and lower confidence bounds $\mu_{max}$ & $\mu_{min}$

Truncation based on the IV: The input is neural choices ( ), Past History of usage of Neural Choices (#times choice_x was used [rec_x], #times choice_x gave good accuracy [pos_x]). The steps are explained below:

Step 1: For every choice $Choice_i$

Step 2: Get #times used=$rec_j^i$ and #times Accuracy above chosen threshold $\tau$ with $$\text{Choice} = pos_j^i;\ \forall\ j \in \text{Bins}$$

Step 3: Information Value for $Choice_i$ $$(IV^{(i)}) = \sum_{j=1}^{k}\left((\%\ pos_j^i - \%\ rec_j^i) \times \ln\left(\frac{\%\ pos_j^i}{\%\ rec_j^i}\right)\right)$$

where k is the number of bins of the domain of a variable in question. For instance, for the neural choice such as DepthwiseConv the domain is the filter size, which may vary between 1 to ∞. (for brevity lets consider 1 to 10). Now there could be 3 bins 1-3, 4-6, 7-10 so k=3. So, for bin 1, $pos_1^x$=#1×1 or 2×2 or 3×3 filters have been used and gave high Acc. And $rec_1^x$=#1×1 or 2×2 or 3×3 filters have been used as whole.

Step 4: Choose A={x|$IV^{(x)}$ in top n}. Further, the truncation continues by repeating from the Step 1.

Truncation based on confidence bounds: The input is neural Choices ( ), the policy distribution over neural choices $\pi(a|s)$; $a\in\{Ch_1, \ldots, Ch_n\}$. The steps are explained below:

Step 1: Find lower and upper confidence bounds for $\pi(a|s)$=#$\mu_{min}$ &$\mu_{max}$ based on confidence level δ>95%

Step 2: For finding truncation points based on $\mu_{min}$ & $\mu_{max} \rightarrow \chi_{min}$ & $\chi_{max}$ Step 3: Choose $B=\{x|\chi_{min}\leq\pi(x|s)\leq\chi_{max}\}$.

The final truncated distribution is obtained by restricting the sample of Neural choices, $N=A\cap B$ The expected latency (i.e. step 4 in FIG. 13A) is determined using the following steps, where the inputs are the latency predictor meta-model [Ensemble Regression model M], the neural choices [Ch1, . . . , Ch_n], and the predicted policy distribution $\pi(x|s)$ where $x\in\{Ch_1, \ldots, Ch_n\}$.

Step 1: At iteration i→Learnable Block i

Step 2: For each choice $ch_x\in\{Ch_1, \ldots, Ch_n\}$

Step 3: Sample hardware parameters: $HwSample_j=\{H_1=h_1, H_2=h_2, \ldots\}$ Step 4: Predict Latency using M:

$$Lat_i^{(x)} = M(HwSample_j, \ldots, Ch_x)$$

Step 5: Repeat Hardware sampling and find average:

$$\overline{Lat^{(x)}} = \frac{1}{|j|}\Sigma_j Lat_j^{(x)}$$

Step 6: Repeat for all Neural Choices

Step 7: Find expected latency $Lat_i=E_{\sim\pi(x|s)}\lfloor\overline{Lat^{(x)}}\rfloor$, where the hardware parameters sampling is done with uniform random distribution.

The latency predictor meta-model is built in the following way: The underlying distribution, given the nature of the feature space (hybrid), will not be a convex hull. Thus, the ensemble regression models are chosen as the meta-model. The central idea is that, since the latency is a non-convex piecewise function, an ensemble model can faithfully model different sections of the distribution via multiple weak models.

More specifically, a bag-of-boosted regression trees model is designed where the outer bag is a random regression forest and each inner weak regression model is built via TreeBoost (tree variant of XGBoost). The feature space for this metamodel is vector, $$X = \langle x_A^1, \ldots, x_A^m, x_T^1, \ldots, x_T^n, x_H^1, \ldots, x_H^k \rangle,$$

where, $$x_A^i$$

signifies architectural parameters of a DNN, $$x_T^j$$

signify task parameters and $$x_H^k$$

signify the hardware parameters (compute units, memory capacity etc.) Latency fn.

$$y_F = \mathcal{F}(\langle x_A^1, \ldots, x_A^m, x_T^1, \ldots, x_T^n, x_H^1, \ldots, x_H^k \rangle)$$

is a function operating on a hybrid feature space. For instance, compute unit(s) is categorical, whereas convolutional filter size is integer and memory/load are real. To faithfully represent a hybrid distribution a piecewise function is designed, $$y_F = \begin{cases} \infty, & x_P^i = C \\ F(X), & \text{otherwise} \end{cases}.$$

Since this is a piecewise function this does not have gradient over the whole space.

The expected accuracy (i.e. step 6 in FIG. 13A) is determined using the following steps, where the inputs are the candidate abstract DNN model (504) with learned weights from the step 5 of FIG. 13A, the policy distributions of each learnable block $\pi_l$; where l=1 to i, and a validation data.

Step 1: Sample hardware parameters: $HwSample_j=\{H_1=h_1, H_2=h_2, \ldots\}$ Step 2: Sample path p in the abstract DNN (504) to form instance DNN For l=1 to i $$Ch_l \sim \pi_l(\text{HwSample}_j)$$

Instance DNN $$D_p^l = \text{Attach}(D^{l-1}, Ch_l)$$

Step 3: Get accuracy of instance DNN of path p using Validation data $Acc_p=D_p$(Validation set). Repeat for P paths from the step 2 (i.e. Sample path p in the abstract DNN (504) to form instance DNN). Repeat for |j| Hw samples from the step 1 (i.e. Sample hardware parameters).

Step 4: Compute expected accuracy:

$$Acc_i = \frac{1}{|j|}\sum_j \sum_{p \in P}\left[\prod \pi_l^p(HwSample_j)\right] \times Acc_p$$

The Q function approximator update and RL step (i.e. steps 7-8 in FIG. 13A) is described in the following steps, where the inputs the expected latency $Lat_i$, expected accuracy $Acc_i$, current approximator model m (multilayer perceptron with parameters θ). Initialize: $\Phi_0=0$; $\in_0$ 1; $0<\beta\leq 1$ Step 1: Let shaping reward $R^\Phi=Lat_i$ Step 2: $\delta^\Phi=R^\Phi+\gamma^\Phi(s', a')-\Phi(s, a)$: Note that a is the action space (All the neural choices); The state space is described in the attached SBPA submission Step 3: Shaping potential $\Phi_{t+1}(s, a)=\Phi_t(s, a)+\beta\delta_t^\Phi$ Step 4: $Q(s, a)^t=(R^t+E_{\sim\pi(a|S)}[\gamma Q(s', a')-Q^{t-1}(s, a)])+\in_t\Phi_t$; where $R^t=Acc_i$ Step 5:

$$\epsilon_t = \begin{cases} \epsilon_{t-1} \times e^\Delta, & \epsilon_t > \text{threshold} \\ 0, & \text{otherwise} \end{cases}; \text{ Where } \Delta = Acc_i - Acc_{i-1}$$

Step 6: Update parameters of MLPM

Predicted Q: $\widehat{Q(s,a)}=M(s, a)$

Real Q: $Q(s, a)^t$

Gradient $\nabla=F(Q(s, a)^t-\widehat{Q(s,a)})$

Parameter update: $\theta^{new}=\theta^{old}+\eta\times\text{sign}(\nabla)$

Further, the steps need to repeat for RL Epoch #from step 1 (Let shaping reward $R^\Phi=Lat_i$).

Figure 14:
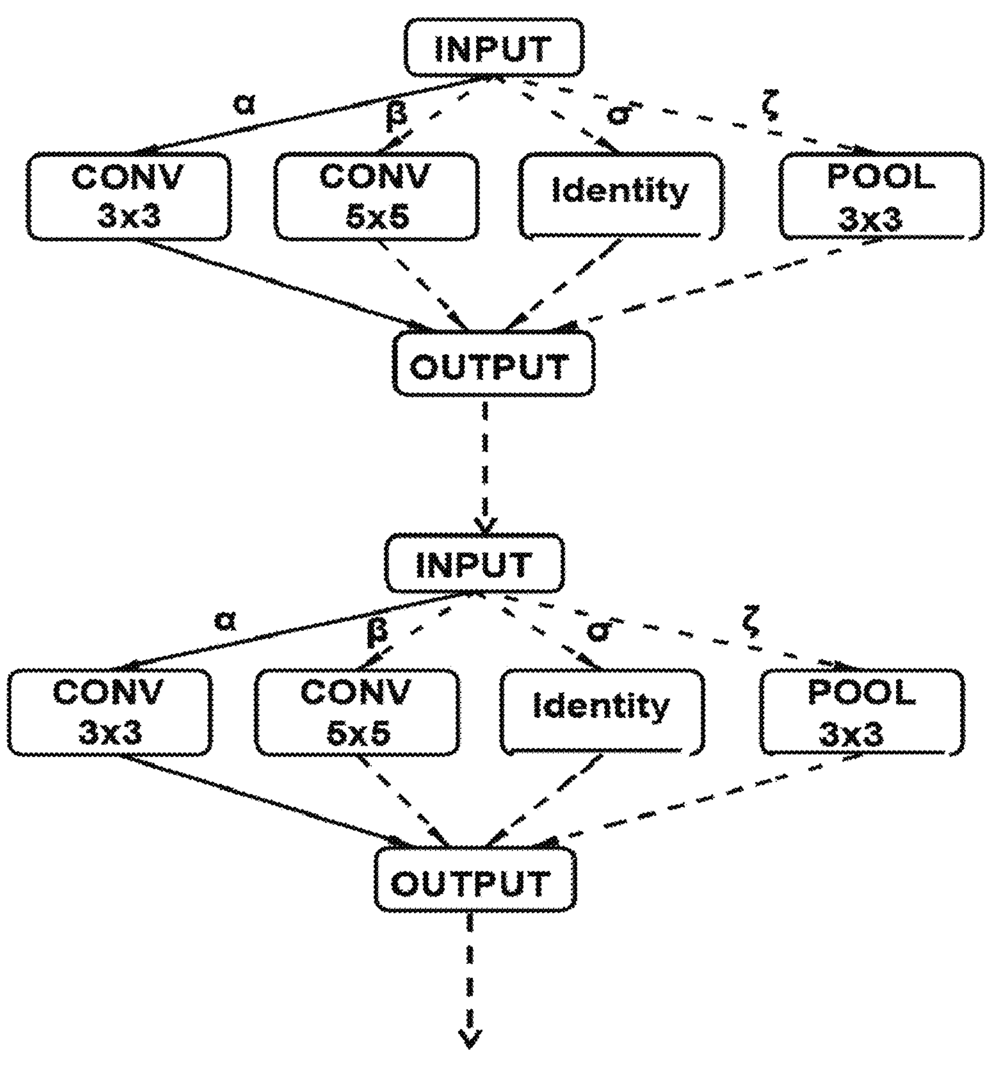
FIG. 14 illustrates a flow diagram that includes steps performed in the method of learning weights for the abstract DNN model, according to an embodiment as disclosed herein.

FIG. 14 illustrates a flow diagram that includes steps performed in the method of learning weights for the abstract DNN (504), according to an embodiment as disclosed herein. A separate weight/filter tensors (i.e. α, β, σ, ξ) can be maintained and updated for the multiple branches (neural choices) (i.e. conv 3×3, conv 5×5, identity, pool 3×3) in each layer with slight modification. The abstract DNNs (504) differ a lot theoretically and technically from multi-branch networks. In the multi-branch networks the branches are independent starting from layer 0 to final layer. The losses of all branches are computed together jointly and the weight matrices are updated during backpropagation independently because the gradient with propagate along the branches independently. The branches are choices at each layer of the abstract DNN (504) and coexist at that layer and one output goes to the next layer which again has multiple coexisting choices.

$$L(\Theta_j^i) = -\sum_{n=1}^{C} q_n \ln(p_n)$$

where $$\Theta_j^i$$

are the weight parameters of the j-th neural block choice in the ith layer and C=#classes. The parameter updates however will be different compared to multi-branch. The original updates would be $$\theta_j^{i(t+1)} = \theta_j^{i(t)} \pm \eta\nabla L.$$

But in the proposed method, the branches are dependent on each other based on the truncated distributions ($\pi_j^i(X=K)$).

$$\theta_j^{i(t+1)} = \theta_j^{i(t)} \pm \pi_j^i(X=K) \times \eta\nabla L$$

One caveat is that it is space inefficient to store all possible weight tensors for all choices. The proposed method includes encoding larger tensors in terms of smaller tensors via Singular Value Decomposition (SVD). Let $T_{5\times5}$ be a 5×5 convolution filter and let $T_{3\times3}$ be a 3×3 conv filter. SVD $T_{5\times5}=T_{3\times3}\times\Lambda\times U_{3\times3}$, where $U_{3\times3}$ be another 3×3 tensor. As such, $T_{3\times3}$ and $U_{3\times3}$ are stored.

Figure 15A:
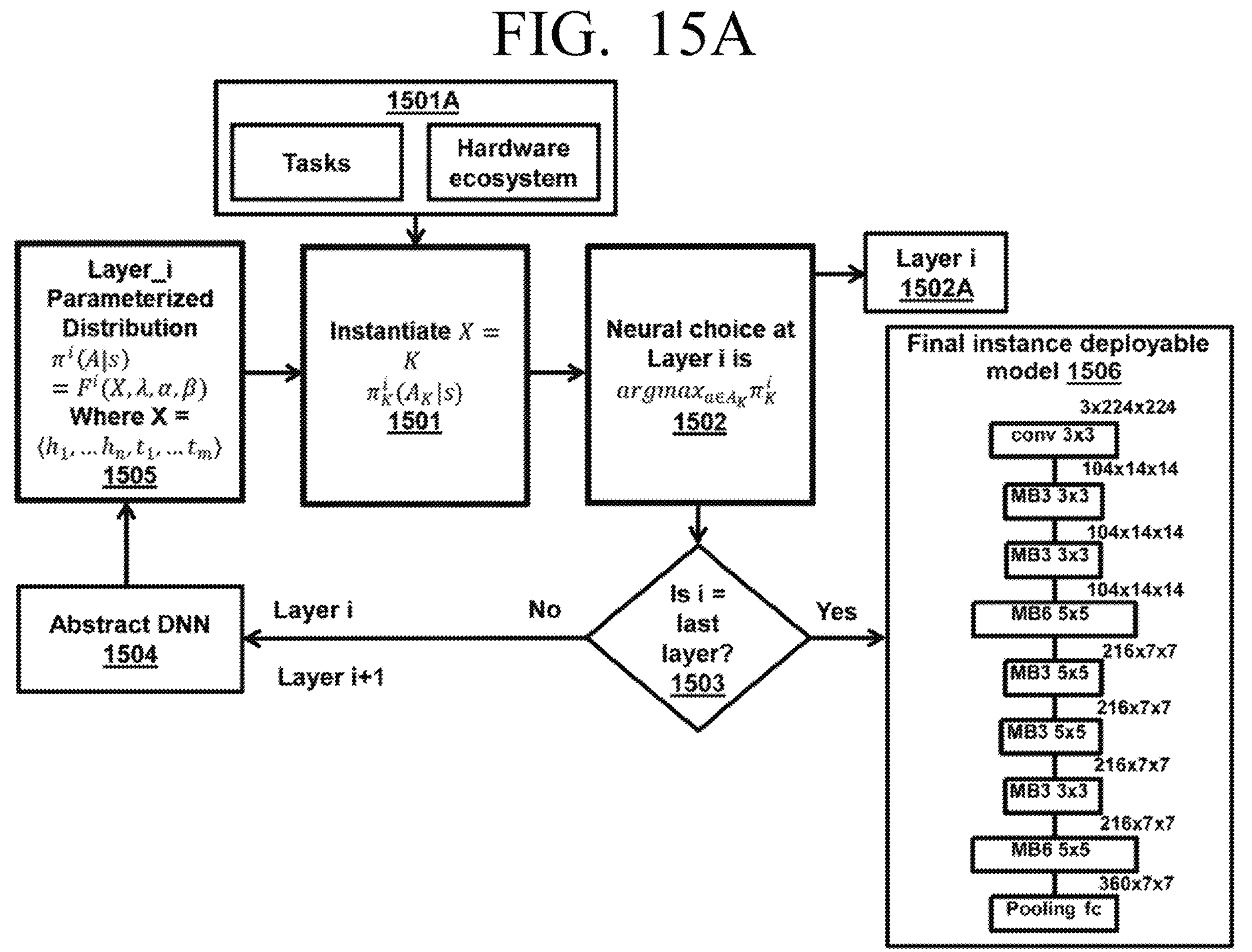
FIG. 15A illustrates a flow diagram that includes steps performed in the method of instantiation at the deployment, according to an embodiment as disclosed herein.

FIG. 15A illustrates a flow diagram that includes steps performed in the method of instantiation at the deployment, according to an embodiment as disclosed herein. At the time of deployment, the NAS controller (110) performs an iterative loop on every layer to choose the ideal neural block, as the steps below.

At step 1501, For layer i, the NAS controller (110) instantiates at X=x and get $\pi_i=P(ch|X=x, \lambda, \alpha,\beta)$: $ch\in N_i$. At step 1502, the NAS controller (110) selects the neural block according to $Ch=\text{argmax}_{ch\in N_i}(P(ch|X=x, \lambda, \alpha,\beta))$. At step 1503, the NAS controller (110) checks whether i=final layer (Before fully connected layer). When 'i' is not equal to the final layer then, the NAS controller (110) start continues the step 1(501) using the parameterized distribution for the layer_i (1505) of the abstract DNN (1504). When 'i' is equal to the final layer then, the NAS controller (110) generates the final instance deployable model (1506) using all the layers.

Figure 15B:
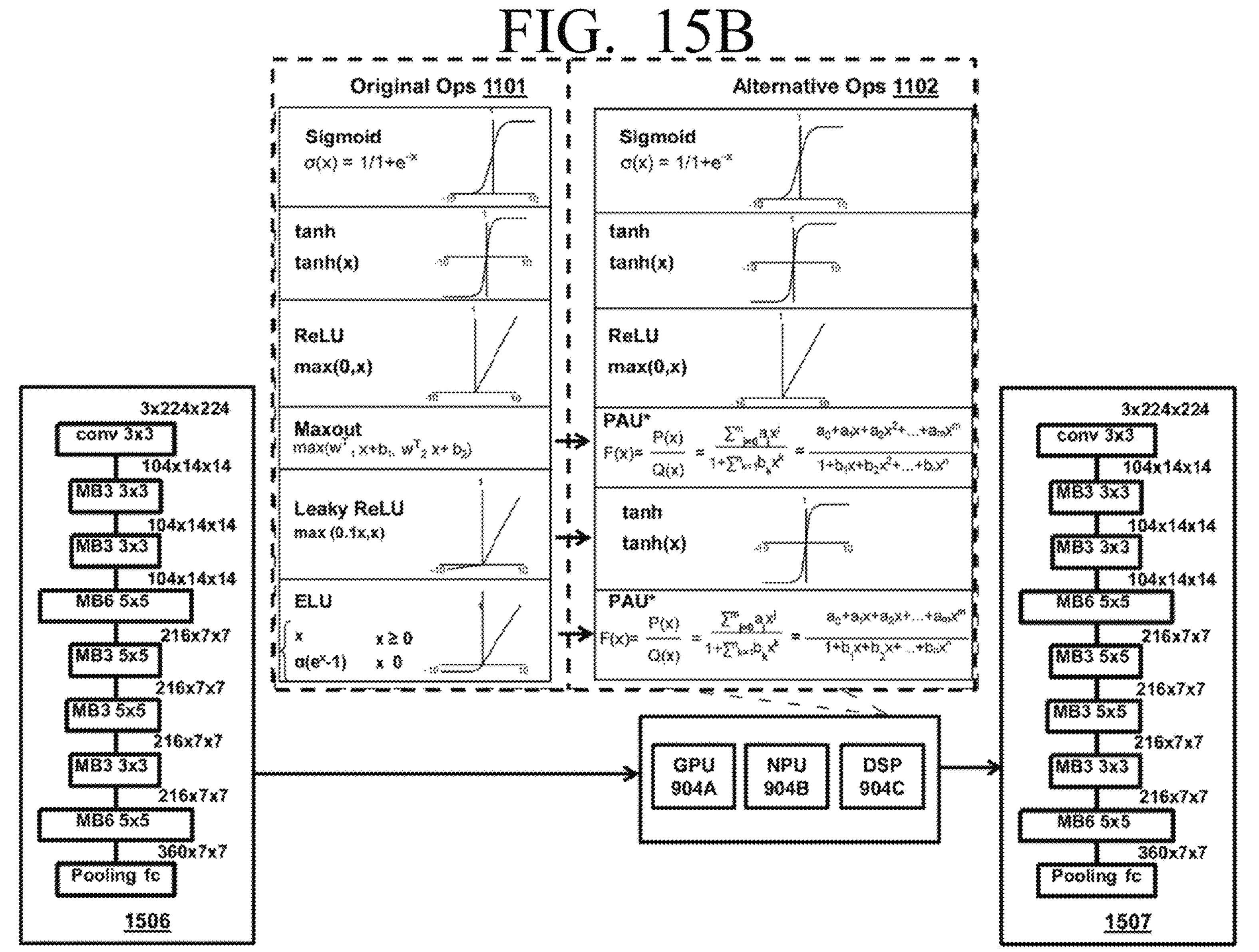
FIG. 15B illustrates a flow diagram that includes steps performed in the method of customizing the operations, according to an embodiment as disclosed herein.

FIG. 15B illustrates a flow diagram that includes steps performed in the method of customizing the operations, according to an embodiment as disclosed herein. After constructing the final instance deployable model (1506), the electronic device (100) searches to the knowledgebase of supported/unsupported operations and uses the decision metamodel (505A) to predict the optimal replacement (1102) for the unsupported operations (1101) in the final instance deployable model (1506). Further, the controller (905) of the NAS platform (900) evaluates suitability of the best candidate operations based on the performance, the hardware compatibility, the efficiency and the task precision. When the suitable known alternative operations are not found for attaining the given accuracy/efficiency, the controller (905) inserts the universal approximators such as the PAUs or other power series approximations to the unsupported operations in the abstract DNN (504) and generates the optimal DNN (513). The trainer of the NAS platform (900) retrain layer=i for which the replacement was made or optimizes m, n the orders of polynomials in PAUs. Objective function is ($|O_{old}-O_{new}|$), where $O_{old}$ is the output of the original layer and $O_{new}$ is the output of the modified layer. As shown in the FIG. 15B, the Maxout, a Leaky ReLU, the ELU in the original operations (1101) are the unsupported operations for the NPU (904B) in the final instance deployable model (1506). The controller (905) (905) of the NAS platform (900) replaces the Maxout, the Leaky ReLU, the ELU in the original operations (1101) with the PAU, a tanh, the PAU operations in the alternative operations (1102) respectively that are supporting by the NPU (904B) for the deployment. Further, the controller (905) generates the final instance deployable model (1507) with the supporting operations suitable for the NPU (904B).

FIG. 16 illustrates an example scenario of text detection and segmentation over the image using the proposed deployment engine (506), according to an embodiment as disclosed herein. The tasks in the example scenario are the image with an embedded caption (501B) and a human segmentation task (501A). The hardware in the example scenario are the CPU/GPU (507) and the QC NPU/DSP (508). The deployment engine (506) detects (511) the objects in the image with the embedded caption (501B) in sequence. Further, the deployment engine (506) computes the probability for the neural blocks for conv-deConv and provides (512) the probability information and the detected objects with the sequence to the abstract DNN (504). The abstract DNN (504) performs a 3×3 Cony w/ReLU6 operation (513) on the input received from the deployment engine (506). Further, the abstract DNN (504) detects characters from an output of the 3×3 Cony w/ReLU6 operation (513) using the character detection filter (514). Further, the abstract DNN (504) encodes the characters with the sequence using a sequence encoder (515) and computes an appropriate probability of the neural blocks for the image and the text. Further, the abstract DNN (504) provides (516) the appropriate probability of the neural blocks for the image and the text to the deployment engine (506)

The deployment engine (506) combines the squeeze HW and Unsqueeze HW, i.e. CPU/GPU (507) for the human segmentation task (501A) and detects (517) that the CPU/GPU (507) supports all operations in the human segmentation task (501A). Further, the deployment engine (506) provides the operation capability information of the CPU/GPU (507) to the abstract DNN (504). The abstract DNN (504) performs a 7×7 Cony w/ReLU6 operation (518), a 3×3 Cony w/MaxOut operation (519) and a 3×3 DeConv w/ReLU operation (520) on the operation capability information of the CPU/GPU (507) consecutively. The abstract DNN (504) provides the output of the 3×3 DeConv w/ReLU operation (520) to the deployment engine (506). Thus, the abstract DNN (504) learns (524) for varied hardware and tasks.

The deployment engine (506) determines (521) whether the QC NPU/DSP (508) supports the ReLU6 operation. In response to determining that the QC NPU/DSP (508) supports the ReLU6 operation, the deployment engine (506) generates the final instance model (523) using the outputs of the abstract DNN (504). In response to determining that the QC NPU/DSP (508) does not support the ReLU6 operation, the deployment engine (506) replaces or optimizes (522) the ReLU6 with ReLU/trained PAUs. Further, the deployment engine (506) generates the final instance model (523) using the outputs of the abstract DNN (504) and the ReLU/trained PAUs.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of operating an electronic device, the method comprising:

identifying, by the electronic device, at least one task to be executed in the electronic device;

estimating, by the electronic device, at least one performance parameter to be achieved while executing the at least one task, wherein the at least one performance parameter is at least one of a frame rate, a resolution, and a bit rate;

determining, by the electronic device, at least one hardware parameter of the electronic device used to execute the at least one task based on the at least one performance parameter and the at least one task, wherein the at least one hardware parameter is at least one of a processor speed, a number of cores in a processor, a data transmission speed, a storage capacity of a memory, and a write/read speed at the memory;

performing, by the electronic device, a Neural Architecture Search (NAS) of a plurality of neural blocks from a Deep Neural Network (DNN) model, based on the at least one performance parameter, the at least one hardware parameter of the electronic device, and a search space including all possible choices of the plurality of neural blocks;

determining, by the electronic device, a quality of each neural block in the plurality of neural blocks based on (i) a probability distribution in executing the at least one task and (ii) a two-step truncation operation that includes truncation based on information value, and truncation based on confidence bounds;

selecting, by the electronic device, at least one optimal neural block from the plurality of neural blocks based on a result of the NAS and the quality of each neural block;

generating, by the electronic device, an optimized DNN model within the electronic device for executing the at least one task based on the at least one optimal neural block; and executing, by the electronic device, the at least one task using the optimized DNN model, wherein inputs to the truncation based on information value include neural choices, and a past history of usage of the neural choices and wherein inputs to the truncation based on confidence bounds include neural choices and a policy distribution over the neural choices.

2. The method as claimed in claim 1, wherein estimating, by the electronic device, the at least one performance parameter to be achieved while executing the at least one task comprises:

obtaining, by the electronic device, execution data for different types of DNN architectural elements from different types of hardware configuration of a plurality of electronic devices;

training, by the electronic device, a hybrid ensemble meta-model based on the execution data; and estimating, by the electronic device, the at least one performance parameter to be achieved while executing the at least one task based on the hybrid ensemble meta-model.

3. The method as claimed in claim 1, wherein selecting, by the electronic device, the at least one optimal neural block from the plurality of neural blocks based on the result of the NAS comprises:

representing, by the electronic device, an intermediate DNN model using the plurality of neural blocks;

providing, by the electronic device, data inputs to the intermediate DNN model, wherein the quality of each neural block in the plurality of neural blocks is determined based on a probability distribution in executing the at least one task using the data inputs, the at least one performance parameter and the at least one hardware parameter;

generating, by the electronic device, a standard DNN model using the at least one optimal neural block; and optimizing, by the electronic device, the standard DNN model by modifying unsupported operations used for the execution of the at least one task with supported operations to generate the optimized DNN model.

4. The method as claimed in claim 3, wherein representing, by the electronic device, the intermediate DNN model using the plurality of neural blocks, comprises:

maintaining, by the electronic device, a truncated parameterized distribution over all of the plurality of neural blocks at each layer that manifests a measure of a relative value of every neural block among the plurality of neural blocks subject to the at least one hardware parameter and the at least one task;

electing, by the electronic device, useful neural elements based on the two-step truncation operation; and representing, by the electronic device, the intermediate DNN model using the selected useful neural elements.

5. The method as claimed in claim 3, wherein determining, by the electronic device, the quality of each neural block in the plurality of neural blocks based on the probability distribution in executing the at least one task using the data inputs, the at least one performance parameter and the at least one hardware parameter, comprises:

encoding, by the electronic device, a layer depth and features of neural blocks;

creating, by the electronic device, an action space comprising a set of neural block choices for every learnable block;

determining, by the electronic device, based on the two-step truncation operation, a usefulness of the set of neural block choices;

adding, by the electronic device, an abstract layer with choices, from the two-step truncation operation, of the set of neural block choices with the at least one hardware parameter and the at least one task;

finding, by the electronic device, an expected latency for the set of neural block choices using a latency predictor metamodel; and finding, by the electronic device, an expected accuracy after adding the set of neural block choices by sampling paths in the abstract layer.

6. The method as claimed in claim 3, wherein selecting, by the electronic device, the at least one optimal neural block from the plurality of neural blocks based on the quality of each neural block, comprises:

instantiating, by the electronic device, the intermediate DNN model;

extracting, by the electronic device, constant values for the at least one task and the at least one hardware parameter based on the intermediate DNN model; and selecting, by the electronic device, the at least one optimal neural block from the plurality of neural blocks based on the quality of each neural block.

7. The method as claimed in claim 3, wherein optimizing, by the electronic device, the standard DNN model by modifying the unsupported operations used for the execution of the task with the supported operations to generate the optimized DNN model, comprises:

searching, by the electronic device, for standard operations at a knowledgebase to replace the unsupported operations, and performing, by the electronic device, at least one of:

replacing the unsupported operations with the standard operations, and retraining at least one neural block of the plurality of neural blocks with the standard operations, when the standard operations are available; or optimizing the unsupported operations using universal approximator Pade' Approximation Units (PAUs) for the task execution, when the standard operations are unavailable.

8. An electronic device comprising:

a memory;

a processor; and a Neural Architecture Search (NAS) controller, operably coupled to the memory and the processor, wherein the processor is configured to:

identify at least one task to be executed in the electronic device;

estimate at least one performance parameter to be achieved while executing the at least one task, wherein the at least one performance parameter is at least one of a frame rate, a resolution, and a bit rate;

determine at least one hardware parameter of the electronic device used to execute the at least one task based on the at least one performance parameter and the at least one task, wherein the at least one hardware parameter is at least one of a processor speed, a number of cores in the processor, a data transmission speed, a storage capacity of the memory, and a write/read speed at the memory;

perform a Neural Architecture Search (NAS) of a plurality of neural blocks from a Deep Neural Network (DNN) model, based on the at least one performance parameter, the at least one hardware parameter of the electronic device, and a search space including all possible choices of the plurality of neural blocks;

determine a quality of each neural block in the plurality of neural blocks based on (i) a probability distribution in executing the at least one task and (ii) a two-step truncation operation that includes truncation based on information value, and truncation based on confidence bounds;

select at least one optimal neural block from the plurality of neural blocks based on a result of the NAS and the quality of each neural block;

generate an optimized DNN model within the electronic device for executing the at least one task based on the at least one optimal neural block; and execute the at least one task using the optimized DNN model, wherein inputs to the truncation based on information value include neural choices, and a past history of usage of the neural choices and wherein inputs to the truncation based on confidence bounds include neural choices and a policy distribution over the neural choices.

9. The electronic device as claimed in claim 8, wherein to estimate the at least one performance parameter to be achieved while executing the at least one task, the processor is configured to:

obtain execution data for different types of DNN architectural elements from different types of hardware configuration of a plurality of electronic devices;

train a hybrid ensemble meta-model based on the execution data; and estimate the at least one performance parameter to be achieved while executing the at least one task based on the hybrid ensemble meta-model.

10. The electronic device as claimed in claim 8, wherein to select the at least one optimal neural block from the plurality of neural blocks based on the result of the NAS, the processor is configured to:

represent an intermediate DNN model using the plurality of neural blocks;

provide data inputs to the intermediate DNN model, wherein the quality of each neural block in the plurality of neural blocks is determined based on a probability distribution in executing the at least one task using the data inputs, the at least one performance parameter and the at least one hardware parameter;

generate a standard DNN model using the at least one optimal neural block; and optimize the standard DNN model by modifying unsupported operations used for the execution of the at least one task with supported operations to generate the optimized DNN model.

11. The electronic device as claimed in claim 10, wherein to represent the intermediate DNN model using the plurality of neural blocks, the processor is configured to:

maintain a truncated parameterized distribution over all of the plurality of neural blocks at each layer that manifests a measure of a relative value of every neural block among the plurality of neural blocks subject to the at least one hardware parameter and the at least one task;

select useful neural elements based on the two-step truncation operation; and represent the intermediate DNN model using the selected useful neural elements.

12. The electronic device as claimed in claim 10, wherein to determine the quality of each neural block in the plurality of neural blocks based on the probability distribution in executing the at least one task using the data inputs, the at least one performance parameter and the at least one hardware parameter, the processor is configured to:

encode a layer depth and features of neural blocks;

create an action space comprising a set of neural block choices for every learnable block;

determine, based on the two-step truncation operation, a usefulness of the set of neural block choices;

add an abstract layer with choices, from the two-step truncation operation, of the set of neural block choices with the at least one hardware parameter and the at least one task;

find an expected latency for the set of neural block choices using a latency predictor metamodel; and find an expected accuracy after adding the set of neural block choices by sampling paths in the abstract layer.

13. The electronic device as claimed in claim 10, wherein to select the at least one optimal neural block from the plurality of neural blocks based on the quality of each neural block, the processor is configured to:

instantiate the intermediate DNN model;

extract constant values for the at least one task and the at least one hardware parameter based on the intermediate DNN model; and select the at least one optimal neural block from the plurality of neural blocks based on the quality of each neural block.

14. The electronic device as claimed in claim 10, wherein to optimize the standard DNN model by modifying the unsupported operations used for the execution of the task with the supported operations to generate the optimized DNN model, the processor is configured to:

search for standard operations at a knowledgebase to replace the unsupported operations, and perform at least one of:

replacing the unsupported operations with the standard operations, and retraining at least one neural block of the plurality of neural blocks with the standard operations, when the standard operations are available; or optimizing the unsupported operations, using universal approximator Pade' Approximation Units (PAUs), for the task execution, when the standard operations are unavailable.

15. An intelligent deployment method for neural networks in a multi-device environment, comprising:

identifying, by an electronic device, a task to be executed in the electronic device;

estimating, by the electronic device, a performance threshold at a time of execution of the identified task;

identifying, by the electronic device, an operation capability of the electronic device, wherein the operation capability is at least one of a processor speed, a number of cores in a processor, a data transmission speed, a storage capacity of a memory, and a write/read speed at the memory;

performing, by the electronic device, a Neural Architecture Search (NAS) of a plurality of neural blocks from a Deep Neural Network (DNN) model, based on the operation capability of the electronic device, and a search space including all possible choices of the plurality of neural blocks;

determining, by the electronic device, a quality of each neural block in the plurality of neural blocks based on (i) a probability distribution in executing the identified task and (ii) a two-step truncation operation that includes truncation based on information value, and truncation based on confidence bounds; and configuring, by the electronic device, a pre-trained Artificial Intelligence (AI) model to select one or more neural blocks from the plurality of neural blocks based on a result of the NAS and the quality of each neural block to optimize a performance of the identified task in the electronic device, wherein inputs to the truncation based on information value include neural choices, and a past history of usage of the neural choices and wherein inputs to the truncation based on confidence bounds include neural choices and a policy distribution over the neural choices.

16. The method as claimed in claim 15, wherein the quality of each neural block is determined using a probability distribution in the task execution.

17. The method as claimed in claim 15, wherein a standard Deep Neural Network (DNN) model is generated using the one or more neural blocks.

18. The method as claimed in claim 15, wherein the performance threshold comprises an accuracy threshold, a quality threshold of image, a latency threshold, a memory consumption threshold, a power consumption threshold, and a bandwidth threshold.

19. The method as claimed in claim 15, wherein the operation capability of the electronic device comprises, a screen refresh rate, a sampling rate, a camera resolution, a pixel density of a screen, a frame rate, a screen resolution, single/multiple display, an audio format support, and a video format support.

* * * * *